United States Patent
Kato et al.

(10) Patent No.: US 10,256,747 B2
(45) Date of Patent: Apr. 9, 2019

(54) ELECTRIC POWER CONVERSION DEVICE AND ELECTRIC POWER CONVERSION SYSTEM

(71) Applicant: Mitsubishi Electric Corporation, Chiyoda-ku (JP)

(72) Inventors: Takahiro Kato, Chiyoda-ku (JP); Yu Kawai, Chiyoda-ku (JP); Kenji Fujiwara, Chiyoda-ku (JP); Kikuo Izumi, Chiyoda-ku (JP); Tatsuya Okuda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/780,014

(22) PCT Filed: Nov. 16, 2016

(86) PCT No.: PCT/JP2016/083890
§ 371 (c)(1),
(2) Date: May 30, 2018

(87) PCT Pub. No.: WO2017/126205
PCT Pub. Date: Jul. 27, 2017

(65) Prior Publication Data
US 2018/0358907 A1     Dec. 13, 2018

(30) Foreign Application Priority Data
Jan. 20, 2016  (JP) .................................. 2016-008566

(51) Int. Cl.
*H02M 7/537*     (2006.01)
*H02M 7/5387*    (2007.01)
(Continued)

(52) U.S. Cl.
CPC ....... *H02M 7/53871* (2013.01); *H02M 1/126* (2013.01); *H02M 2001/0009* (2013.01); *H02M 2007/4822* (2013.01)

(58) Field of Classification Search
CPC ..................................................... H02M 7/537
(Continued)

(56) References Cited

U.S. PATENT DOCUMENTS 4,384,321 A * 5/1983 Rippel ................ H02M 1/4225
                                                        320/DIG. 31
4,445,049 A * 4/1984 Steigerwald ........ H02M 3/3155
                                                        307/45
(Continued)

FOREIGN PATENT DOCUMENTS

| EP | 2 731 223 A1 | 5/2014 |
|----|--------------|--------|
| JP | 5217397 B2 | 6/2013 |
| WO | WO 2013/008413 A1 | 1/2013 |

OTHER PUBLICATIONS

International Search Report dated Feb. 7, 2017 in PCT/JP2016/083890 filed Nov. 16, 2016.

*Primary Examiner* — Jeffrey Gblende
*Assistant Examiner* — Nusrat Quddus
(74) *Attorney, Agent, or Firm* — Oblon, McClelland, Maier & Neustadt, L.L.P.

(57) ABSTRACT

In a control unit for drive-controlling a switching element unit of each power conversion device, a voltage correction amount calculation unit calculates a correction amount corresponding to voltage drop due to impedance between the switching element unit and filter reactor. A voltage command correcting unit corrects a voltage command generated by the voltage command generation unit, using the correction amount. Thus, for a power conversion device 21 that has a small output impedance, correction is performed so as to increase the output impedance, and a PLL unit changes the
(Continued)

frequency in accordance with active power calculated from output voltage and output current of the power conversion device, so as to uniform power allocations.

20 Claims, 25 Drawing Sheets

(51) Int. Cl.
  *H02M 1/12* (2006.01)
  *H02M 7/48* (2007.01)
  *H02M 1/00* (2006.01)

(58) Field of Classification Search
  USPC .... 363/41, 17, 34, 36, 37, 97, 98, 131, 132, 363/16
  See application file for complete search history.

(56) References Cited

U.S. PATENT DOCUMENTS

| | | | |
|---|---|---|---|
| 4,782,241 A * | 11/1988 | Baker | H02J 9/062 307/66 |
| 5,126,585 A * | 6/1992 | Boys | H02J 9/062 307/45 |
| 7,030,596 B1 * | 4/2006 | Salerno | H02M 3/158 323/282 |
| 7,425,779 B2 * | 9/2008 | Luo | H02M 7/493 307/82 |
| 8,295,069 B2 * | 10/2012 | Alexander | H02M 5/225 363/132 |
| 9,973,083 B1 * | 5/2018 | Rose | H02M 3/156 |
| 2004/0080293 A1 * | 4/2004 | Kurosawa | H02P 6/182 318/400.11 |
| 2005/0242793 A1 * | 11/2005 | Deaton | H02M 3/1584 323/272 |
| 2012/0153917 A1 * | 6/2012 | Adell | H02M 3/1588 323/283 |
| 2012/0187893 A1 * | 7/2012 | Baba | H02P 25/024 318/722 |
| 2013/0119961 A1 * | 5/2013 | Okuda | H02M 3/158 323/299 |
| 2013/0208517 A1 * | 8/2013 | Mashal | H02M 7/53875 363/40 |
| 2014/0117961 A1 * | 5/2014 | Rigoni | H02M 3/156 323/282 |
| 2014/0152110 A1 | 6/2014 | Sugimoto et al. | |
| 2015/0043253 A1 * | 2/2015 | Awane | H02M 1/4258 363/37 |
| 2016/0006336 A1 * | 1/2016 | Bennett | H02M 1/00 323/271 |
| 2017/0117821 A1 * | 4/2017 | Kato | H02M 7/537 |
| 2018/0202978 A1 * | 7/2018 | Wrobel | G01N 29/024 |

* cited by examiner

ELECTRIC POWER CONVERSION DEVICE AND ELECTRIC POWER CONVERSION SYSTEM

TECHNICAL FIELD

The present invention relates to a power conversion device and a power conversion system, and in particular, relates to technology of parallel operation control in which a plurality of power conversion devices are operated in parallel while load allocations to the plurality of power conversion devices are uniformed.

BACKGROUND ART

In a power conversion system in which a plurality of power conversion devices are driven in parallel to supply powers to a load, there is variation among the output impedances in manufacturing of the power conversion devices even if the power conversion devices have the same specifications. Therefore, variation also occurs in load allocations at the time of load inrush, due to the variation among the output impedances.

In order to suppress occurrence of variation in load allocations as described above, there is a conventional method in which, when a plurality of power conversion devices are operated while being connected in parallel, each power conversion device adjusts, in accordance with an active component of its own output current or its own output active power, a reference phase of output voltage so as to reduce the active component of its own output current or its own output active power. It is noted that a synchronous generator also has such a droop characteristic and the droop characteristic is one of characteristics in parallel operations of a plurality of power generators in a power grid.

For example, Patent Document 1 discloses the following parallel operation system. A plurality of power conversion devices each adjust a reference phase of its own output voltage and the amplitude of output voltage in accordance with its own output current, thereby balancing output powers of the power conversion devices performing parallel operations. Further, a resistance is assumed to be provided in series between a load and a harmonic filter connected to the output end of each power conversion device, voltage drop due to the virtual resistance is calculated from the output current, and the voltage drop is subtracted from a voltage command, whereby resonance among the power conversion devices is suppressed. Thus, even if the line impedances between the load and the respective power conversion devices are different, equal allocation for a nonlinear load such as a rectifier load can be performed and each power conversion device can stably perform parallel operation.

Patent Document 2 discloses that, in a complex power generation system such as a micro-grid, each power conversion device is regarded as a power generator having an internal electromotive voltage command and an impedance, and a plurality of power conversion devices each adjust a reference phase of its own output voltage in accordance with its own output active power, and adjust the internal electromotive voltage command in accordance with its own output reactive power, thereby balancing output powers of the power conversion devices performing parallel operations. Further, the power conversion devices have current control, and when a virtual internal impedance is connected between a power supply of measured voltage and a power supply of internal electromotive voltage, the value of current flowing through the internal impedance is outputted as a command value for output current.

CITATION LIST

Patent Document

Patent Document 1: Japanese Patent No. 5217397
Patent Document 2: International Publication No. WO2013/008413

SUMMARY OF THE INVENTION

Problems to be Solved by the Invention

In the parallel operation system of the power conversion devices disclosed in Patent Document 1 above, since the droop characteristic between active current and a phase is used, each power conversion device needs to detect an active component of its own output current. In general, in order to detect an active component of output current, it is necessary to compare the output current with a sine-wave signal as a reference. Thus, in Patent Document 1, the active component of output current is detected through comparison between output current and a reference phase of output voltage.

However, a time period of one cycle or longer of output voltage is needed for detecting the active component of output current. Therefore, there is a problem that it is impossible to uniform output powers of the power conversion devices when instantaneous power change occurs due to load variation or the like.

That is, when instantaneous power change occurs due to load variation or the like, the allocation is determined in accordance with the output impedance of each power conversion device. Therefore, due to variation in the output impedances of the respective power conversion devices, variation also occurs in instantaneous power allocations. Then, if the output powers cannot be balanced, power allocation to the power conversion device having a small output impedance becomes too great so that the device might be stopped, for example.

In the parallel operation system of the power conversion devices disclosed in Patent Document 2, since a droop characteristic between active power and a phase is used, each power conversion device needs to detect its own output active power. Also in this case, a time period of one cycle or more of output voltage is needed for detecting output active power. Therefore, as in Patent Document 1, there is a problem that it is impossible to uniform output powers of the power conversion devices when instantaneous power change occurs.

The present invention has been made to solve the above problems, and an object of the present invention is to provide a power conversion device and a power conversion system in which, while a plurality of power conversion devices are driven in parallel to supply powers to a load, allocated powers can be uniformed even when instantaneous power change occurs.

Solution to the Problems

A power conversion device according to the present invention includes a switching element unit for converting voltage of a DC power supply connected externally, to voltage corresponding to a voltage command, to supply AC power to a load, and the power conversion device includes: a filter reactor and a filter capacitor for smoothing output of the switching element unit; an output reactor provided between the load and the filter capacitor; a reactor current detection unit for detecting reactor current flowing through the filter reactor; an output voltage detection unit for detecting output voltage of the power conversion device; an output current detection unit for detecting current flowing through the output reactor, as output current; and a control unit for drive-controlling the switching element unit on the basis of detection outputs from the reactor current detection unit, the output voltage detection unit, and the output current detection unit. The control unit includes a voltage command generation unit for generating the voltage command for controlling the output voltage of the power conversion device, a PWM signal generation unit for generating a PWM signal for driving the switching element unit, on the basis of the voltage command, and a PLL unit for changing a frequency of the output voltage in accordance with active power calculated on the basis of the output voltage and the output current. The control unit further includes a voltage correction amount calculation unit for calculating a voltage command correction amount on the basis of the reactor current, and a voltage command correcting unit which corrects the voltage command in accordance with the voltage command correction amount and outputs the corrected voltage command to the PWM signal generation unit.

A power conversion system according to the present invention includes a plurality of the above power conversion devices, and the plurality of power conversion devices are operated in parallel to supply AC power to the load.

Effect of the Invention

In the power conversion device according to the present invention, the voltage command correction amount is calculated on the basis of the reactor current, to correct the voltage command, and thus the output impedance of the power conversion device can be adjusted in accordance with the reactor current. In the case where a plurality of power conversion devices are operated in parallel to supply powers to a load, variation among the output impedances due to variation among the impedances of the filter reactors of the power conversion devices is suppressed. Thus, even when instantaneous power change occurs, concentration of power allocation is prevented and power allocations to the power conversion devices can be improved to be uniformed.

In addition, in the power conversion system in which the plurality of power conversion devices are operated in parallel to supply powers to a load, as described above, variation among the output impedances of the power conversion devices is suppressed, and thus, when instantaneous power change occurs, output powers of the power conversion devices can be uniformed, and stable control with high reliability can be achieved.

DESCRIPTION OF EMBODIMENTS

Embodiment 1

Figure 1:
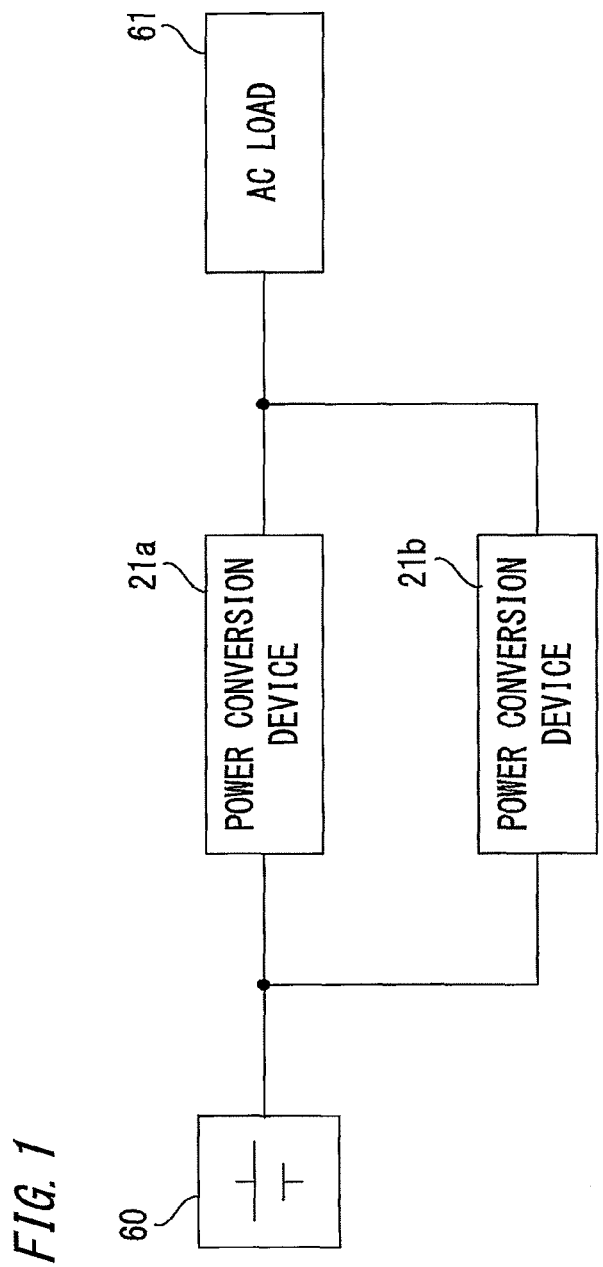
FIG. 1 is a configuration diagram showing an entire power conversion system according to embodiment 1 of the present invention.

FIG. 1 is a configuration diagram showing an entire power conversion system according to embodiment 1 of the present invention.

The power conversion system in the present embodiment 1 has a configuration in which two power conversion devices 21a, 21b perform parallel operations, and DC voltages are supplied from the DC power supply 60 to the respective power conversion devices 21a, 21b. The outputs of the two power conversion devices 21a, 21b are synthesized to be supplied to an AC load 61.

Figure 2:
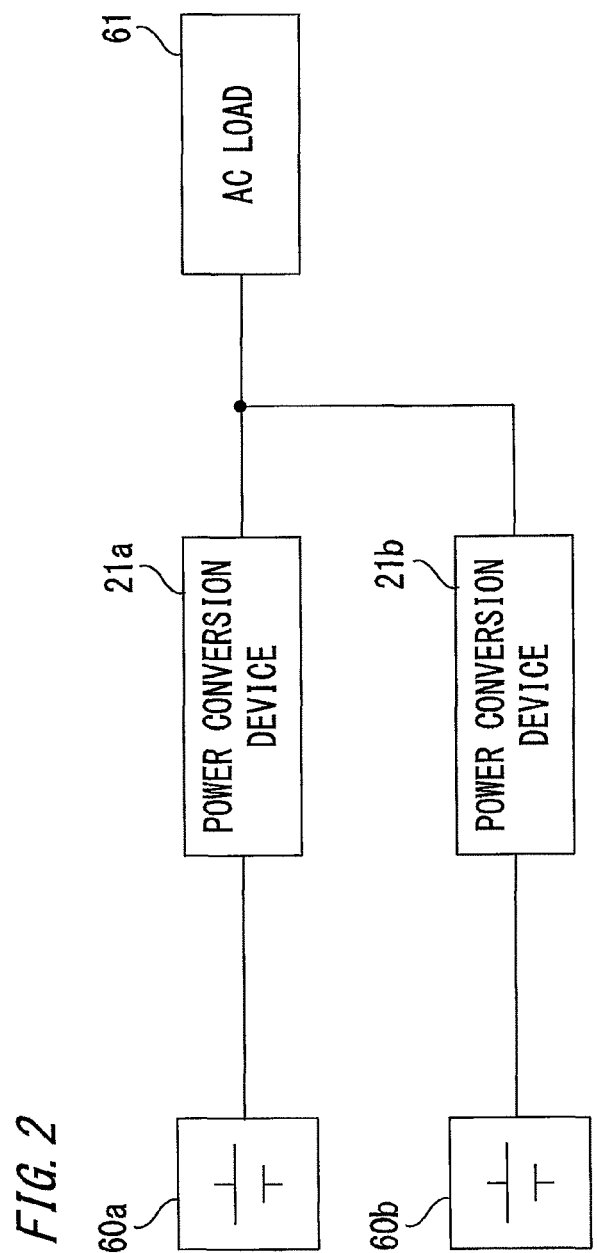
FIG. 2 is a configuration diagram showing an entire power conversion system in another example of embodiment 1 of the present invention.

Here, the DC power supply 60 is used in common for the two power conversion devices 21a, 21b. However, as shown in FIG. 2, DC power supplies 60a, 60b may be connected individually to the respective power conversion devices 21a, 21b. In addition, here, the power conversion devices 21a, 21b equally supply AC powers to the AC load 61.

In the power conversion system of the present embodiment 1, the number of the power conversion devices 21a, 21b performing parallel operations is two. However, in the present invention, the number of the power conversion devices performing parallel operations is not limited to two, but may be three or more. Although only two power conversion devices 21a, 21b perform parallel operations, in the present invention, it is possible to perform parallel operations with a device having a droop characteristic of a frequency with respect to output power such as a power generator.

Figure 3:
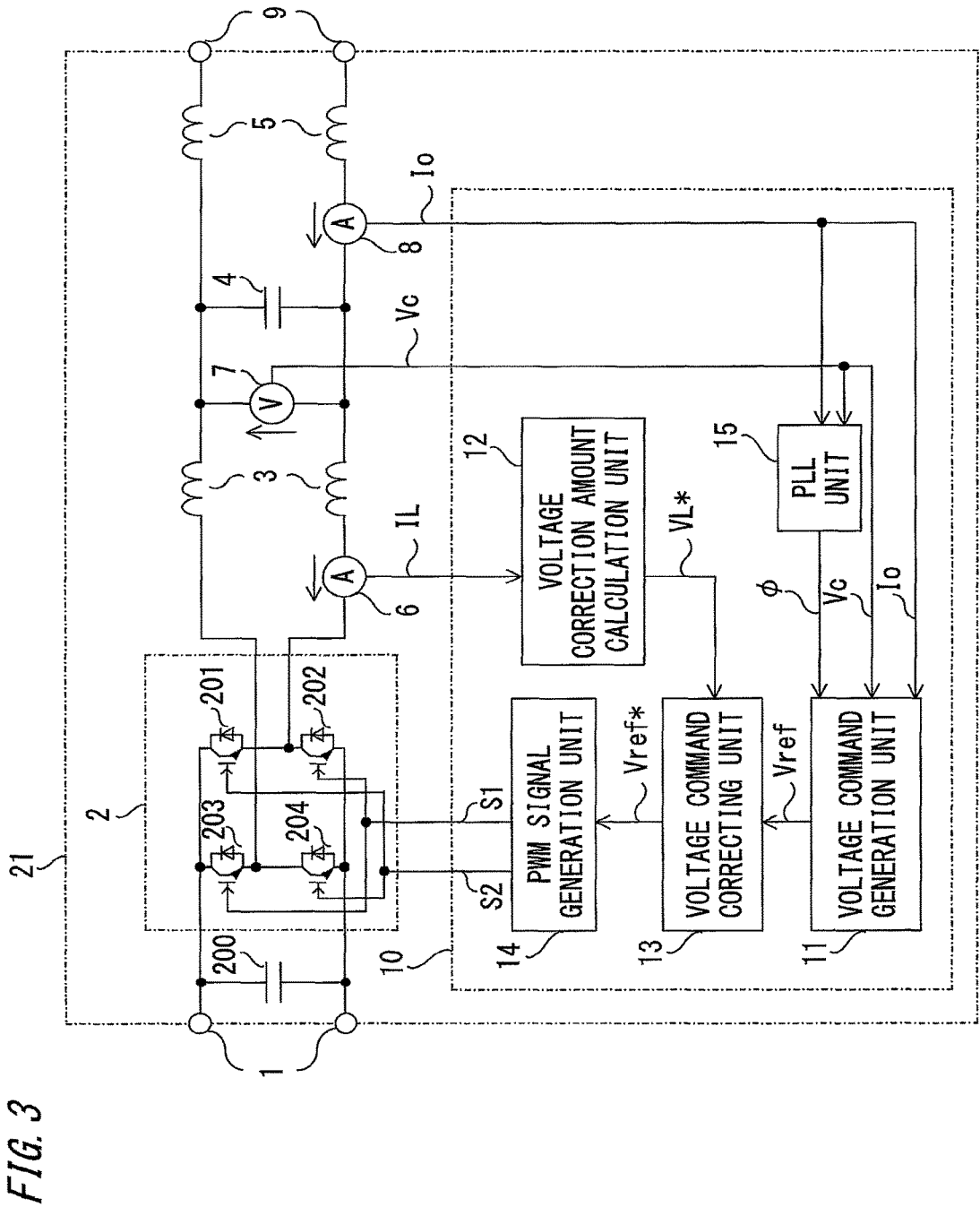
FIG. 3 is a diagram showing the configuration of a power conversion device according to embodiment 1 of the present invention.

FIG. 3 is a diagram showing the configuration of a power conversion device applied to the power conversion system in FIG. 1 and FIG. 2. Here, the power conversion devices 21a, 21b shown in FIG. 1 and FIG. 2 basically have the same configuration. Therefore, unless the respective power conversion devices 21a, 21b are specifically discriminated, they are collectively denoted by reference character 21, i.e., referred to as power conversion devices 21.

As shown in FIG. 3, the power conversion device 21 includes a bus capacitor 200, a switching element unit 2, a filter reactor 3, a filter capacitor 4, an output reactor 5, a reactor current detection unit 6, an output voltage detection unit 7, an output current detection unit 8, a control unit 10, an input terminal 1, and an output terminal 9.

The bus capacitor 200 is connected in parallel between the input terminal 1 and the switching element unit 2, and the other side of the switching element unit 2 is connected to the filter reactor 3. The filter reactor 3 and the output reactor 5 are connected in series between the switching element unit 2 and the output terminal 9, and the filter capacitor 4 is connected in parallel between the filter reactor 3 and the output reactor 5.

For the bus capacitor 200, the capacitance value may be selected so that voltage of the bus capacitor 200 does not become smaller than predetermined voltage when output of the power conversion device 21 is sharply changed. Here, the predetermined voltage is voltage of the bus capacitor 200 that allows the power conversion device 21 to output normal voltage (for example, if output voltage of the power conversion device 21 is 200 Vrms, the predetermined voltage is about 283 V, which is the amplitude of the output voltage).

For the filter reactor 3 and the filter capacitor 4, the inductance value and the capacitance value may be selected so that harmonic components of voltage pulsed by the switching element unit 2 on the basis of voltage of the external DC power supply 60 are reduced so as to obtain a voltage signal having a predetermined frequency component. Here, the predetermined frequency component is in a frequency range (for example, 50 Hz or 60 Hz) of a power grid. For the output reactor 5, the capacitance value may be selected so as to suppress harmonic components of output current of the power conversion device 21. Here, harmonic components are components having approximately a frequency at which the switching element unit 2 performs switching operation.

The reactor current detection unit 6 is connected between the switching element unit 2 and the filter reactor 3 and detects current flowing through the filter reactor 3. The output voltage detection unit 7 is for detecting voltage outputted from the power conversion device 21, and in FIG. 3, is connected in parallel with the filter capacitor 4. In this case, with voltage drop due to the output reactor 5 regarded as small, voltage of the filter capacitor 4 is considered to be the voltage outputted from the power conversion device 21. The output current detection unit 8 is for detecting current outputted from the power conversion device 21, and in FIG. 3, is connected between the filter capacitor 4 and the output reactor 5 and detects current flowing through the output reactor 5 as the output current.

It is noted that, since the reactor current detection unit 6 is for detecting current flowing through the filter reactor 3, the reactor current detection unit 6 may be connected between the filter reactor 3 and the filter capacitor 4. In addition, since the output current detection unit 8 is for detecting current outputted from the power conversion device 21, the output current detection unit 8 may be connected between the output reactor 5 and the output terminal 9.

Further, the output voltage detection unit 7 may be connected on the output terminal 9 side of the output reactor 5.

In FIG. 3, IL is reactor current (hereinafter, referred to as reactor current IL, reactor current, or IL as appropriate) detected by the reactor current detection unit 6, Vc is output voltage (hereinafter, referred to as output voltage Vc, output voltage, or Vc as appropriate) detected by the output voltage detection unit 7, Io is output current (hereinafter, referred to as output current Io, output current, or Io as appropriate) detected by the output current detection unit 8, S1 and S2 are PWM signals outputted from a PWM (Pulse Width Modulation) signal generation unit 14, φ is an internal phase outputted from a PLL unit 15, VL* denotes a correction amount outputted from a voltage correction amount calculation unit 12, Vref is a voltage command outputted from a voltage command generation unit 11, and Vref* is a corrected voltage command outputted from a voltage command correcting unit 13. Hereinafter, the details of each part composing the power conversion device 21 will be described.

The switching element unit 2 converts voltage of the external DC power supply 60 connected to the input terminal 1, to voltage corresponding to the voltage command.

The switching element unit 2 is formed as a single-phase inverter composed of four semiconductor switching elements 201 to 204 so as to have a full-bridge configuration, in which a first leg and a second leg are connected in parallel. The first leg is formed by connecting the semiconductor switching element 201 of an upper arm and the semiconductor switching element 202 of a lower arm in series to each other, and the second leg is formed by connecting the semiconductor switching element 203 of an upper arm and the semiconductor switching element 204 of a lower arm in series to each other. As the semiconductor switching elements 201 to 204, for example, IGBTs or MOSFETs to which diodes are connected in antiparallel are used.

The semiconductor switching elements 201 to 204 are turned on or off in accordance with PWM signals S1, S2 outputted from the control unit 10, thereby deforming voltage of the DC power supply 60 inputted from the input terminal 1, into a pulse shape. Specifically, the semiconductor switching elements 201, 204 are turned on or off by the PWM signal S1, and the semiconductor switching elements 202, 203 are turned on or off by the PWM signal S2.

Here, the case where the switching element unit 2 is formed as a single-phase inverter and supplies power to a single-phase AC load 61 is shown. However, the switching element unit 2 may be formed as a three-phase inverter and supply three-phase AC power to a three-phase AC load.

The pulse voltage outputted from the switching element unit 2 passes through the filter reactor 3, the filter capacitor 4, and the output reactor 5 provided between the switching element unit 2 and the output terminal 9, so as to be formed in a sine waveform.

The control unit 10 receives the detection signals IL, Vc, Io from the detection units 6, 7, 8 and outputs PWM signals S1, S2 for drive-controlling the switching element unit 2. The control unit 10 includes the voltage command generation unit 11, the voltage correction amount calculation unit 12, the voltage command correcting unit 13, the PWM signal generation unit 14, and the PLL (Phase Locked Loop) unit 15. In this case, the internal configuration of the control unit 10 may be implemented by hardware or may be implemented by software. Further, the internal configuration of the control unit 10 may be implemented by a combination of hardware and software. Hereinafter, the details of each part composing the control unit 10 will be specifically described. Here, the case of generating PWM signals by bipolar modulation will be described. However, without limitation thereto, another PWM signal generation method using unipolar modulation or the like may be used.

Figure 4:
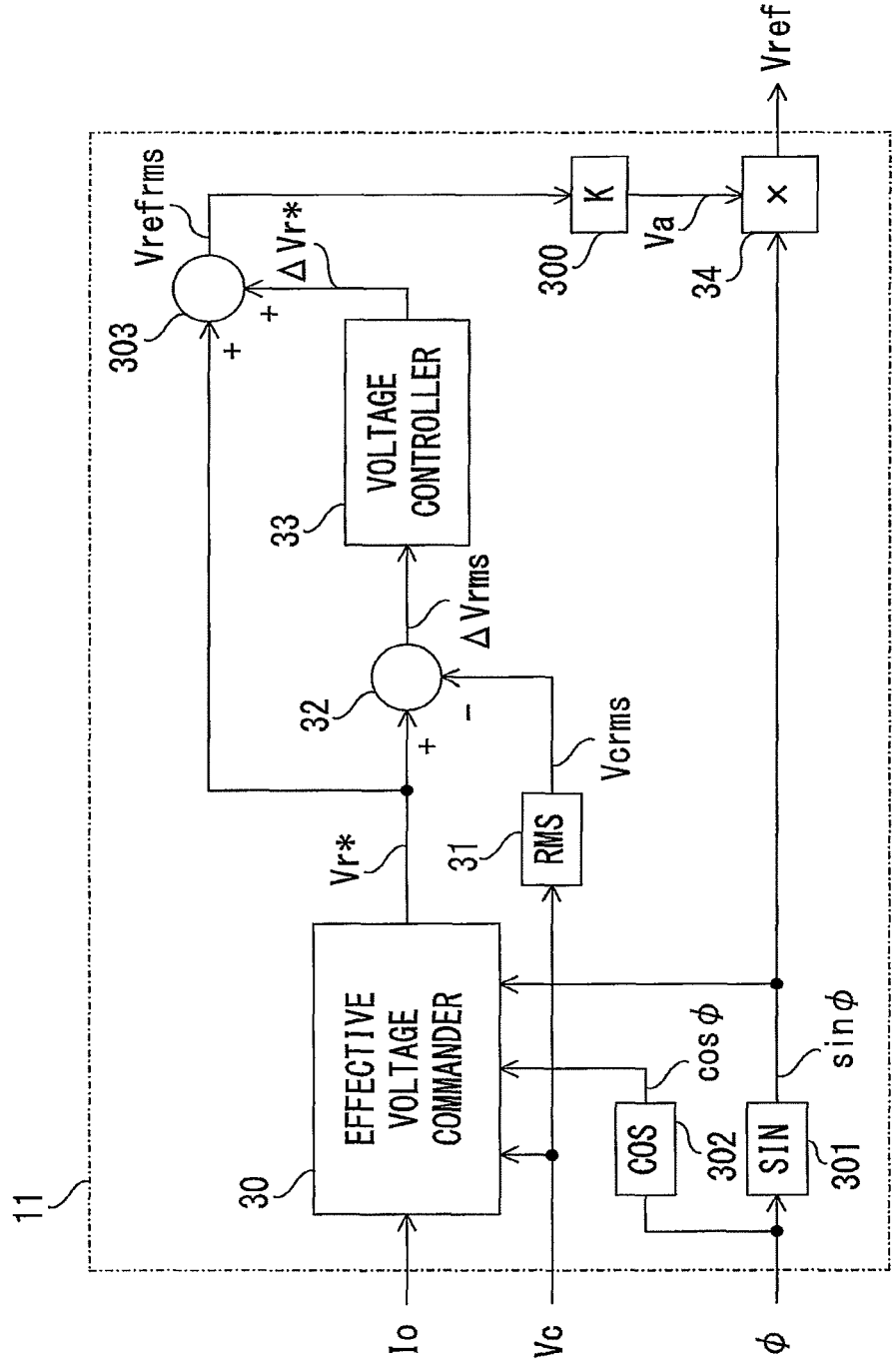
FIG. 4 is a block diagram showing the internal configuration of a voltage command generation unit included in a control unit in FIG. 3.

FIG. 4 is a block diagram showing the internal configuration of the voltage command generation unit 11 included in the control unit 10.

The voltage command generation unit 11 receives output voltage Vc, output current Io, and an internal phase $\varphi$, and outputs a voltage command Vref for controlling output voltage Vc of the power conversion device 21. The voltage command generation unit 11 includes an effective voltage commander 30, an effective value calculator (RMS) 31, a subtractor 32, a voltage controller 33, a multiplier 34, a gain (K) 300, a sine-wave generator (SIN) 301, a cosine-wave generator (COS) 302, and an adder 303.

The voltage command generation unit 11 is for correcting a steady voltage effective value variation due to the filter reactor 3, the output reactor 5, and the voltage correction amount calculation unit 12. In addition, for cross current of reactive power due to voltage amplitude error between the power conversion devices 21, the voltage command generation unit 11 also has a function of adjusting the voltage amplitude so as to suppress the cross current of the reactive power.

In FIG. 4, Vr* is an effective voltage command outputted from the effective voltage commander 30, and Vcrms is a voltage effective value outputted from the effective value calculator 31 and corresponds to the effective value of output voltage Vc. In addition, $\Delta$Vrms is an error of the voltage effective value Vcrms from the effective voltage command Vr*, $\Delta$Vr* is a control quantity outputted from the voltage controller 33, Vrefrms is the effective value of the voltage command Vref, and Va is the amplitude of the voltage command Vref.

The sine-wave generator 301 receives the internal phase $\varphi$ and outputs a sine wave sin $\varphi$. The cosine-wave generator 302 receives the internal phase $\varphi$ and outputs a cosine wave cos $\varphi$.

The effective voltage commander 30 receives the output current Io, the output voltage Vc, the sine wave sin $\varphi$, and the cosine wave cos $\varphi$, and outputs the effective voltage command Vr* as a control target for output voltage Vc of the power conversion device 21.

The effective value calculator 31 receives output voltage Vc and outputs the voltage effective value Vcrms of output voltage Vc.

The subtractor 32 subtracts the voltage effective value Vcrms outputted from the effective value calculator 31, from the effective voltage command Vr*, thereby outputting an error $\Delta$Vrms (=Vr*−Vcrms).

The voltage controller 33 receives the error $\Delta$Vrms and performs control calculation so that the error $\Delta$Vrms approaches 0, thereby outputting the control quantity $\Delta$Vr*. The voltage controller 33 is for correcting the effective value of voltage outputted from the power conversion device 21, and specifically, corrects error of the output voltage effective value that occurs due to voltage drop of the filter reactor 3. In this case, the voltage controller 33 corrects voltage error in a steady state when a sufficient time period has elapsed since sharp load change, in order to control the effective value of voltage outputted from the power conversion device 21.

The voltage controller 33 is configured to perform proportional control or configured by connecting proportional control and a low-pass filter in series, for example. If the voltage controller 33 has an integral element, when the plurality of power conversion devices 21 perform parallel operations and different detection errors are superimposed on the output voltage detection units 7 of the respective power conversion devices 21, the error $\Delta$Vrms inputted to the voltage controller 33 of each power conversion device 21 does not converge to 0 and the integral value of the voltage controller 33 might continue to increase. Therefore, if the voltage controller 33 employs the control configuration that does not include the integral element as described above, the control error due to the integral element is eliminated.

The adder 303 sums the effective voltage command Vr* from the effective voltage commander 30 and the control quantity $\Delta$Vr* from the voltage controller 33, to correct the effective voltage command Vr*, thereby outputting the effective value Vrefrms of the voltage command Vref (Vrefrms=Vr*+$\Delta$V*).

The gain 300 receives the effective value Vrefrms of the voltage command Vref and multiplies the effective value Vrefrms by $\sqrt{2}$ which is a gain for conversion to voltage amplitude, thereby outputting an amplitude Va of the voltage command Vref (Va=Vrefrms×$\sqrt{2}$).

The multiplier 34 multiplies the amplitude Va and the sine wave sin $\varphi$, thereby outputting the voltage command Vref.

Figure 5:
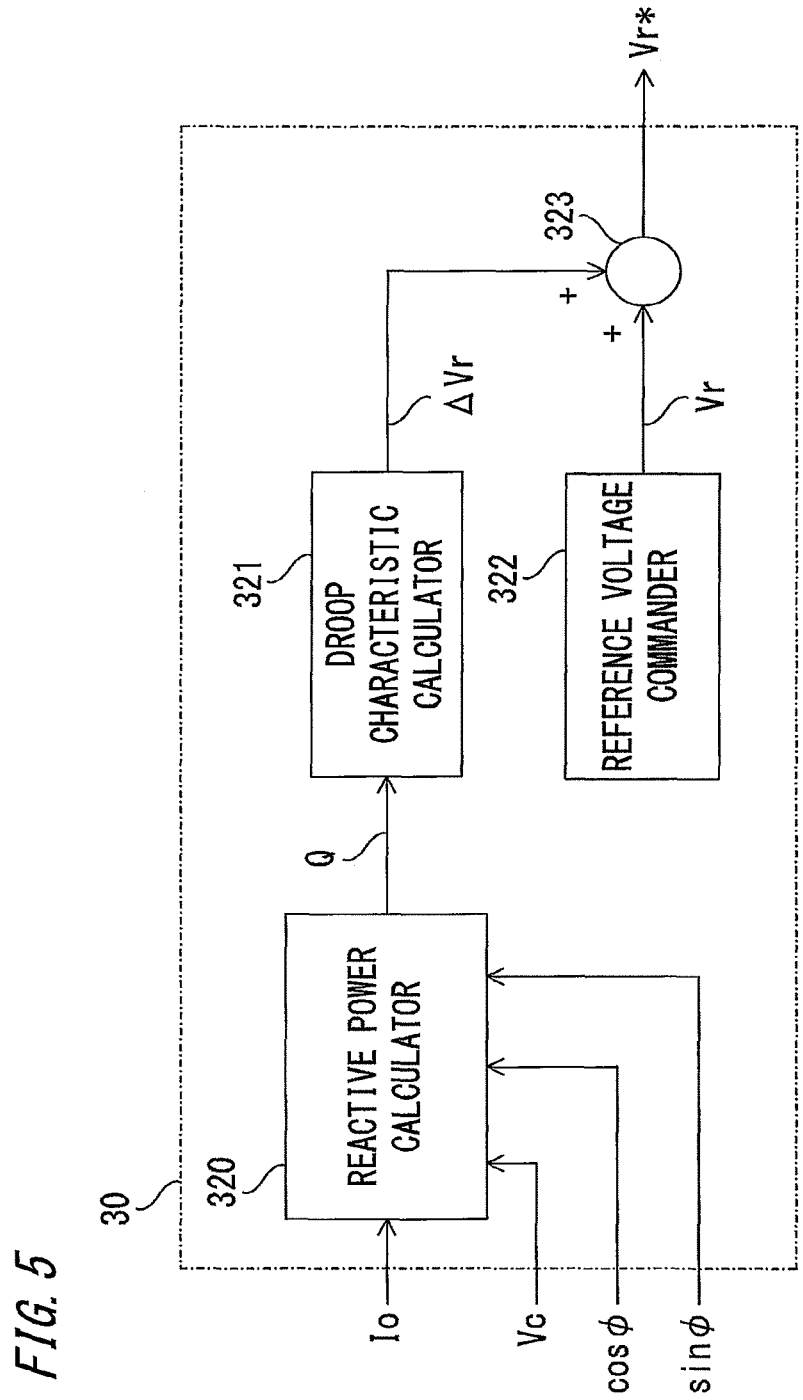
FIG. 5 is a block diagram showing the internal configuration of an effective voltage commander included in a voltage command generation unit in FIG. 4.

FIG. 5 is a block diagram showing the internal configuration of the effective voltage commander 30 included in the voltage command generation unit 11. It is noted that a "fundamental wave" which is used as appropriate in the following description refers to a component having the same frequency as the frequency of the internal phase $\varphi$ of the power conversion device 21 (for example, reactive power of a fundamental wave refers to reactive power of a component having the same frequency as that of the internal phase φ).

As described above, the effective voltage commander 30 receives the output current Io, the output voltage Vc, the sine wave sin φ, and the cosine wave cos φ, and outputs the effective voltage command Vr* for output voltage Vc of the power conversion device 21.

The effective voltage commander 30 includes a reactive power calculator 320, a droop characteristic calculator 321, a reference voltage commander 322, and an adder 323.

In FIG. 5, Q is fundamental wave reactive power, Vr is a reference effective value which is the effective value of reference voltage, and ΔVr is a correction amount for the reference effective value Vr. It is noted that the reference effective value Vr is the effective value of reference voltage which is common between the plurality of power conversion devices 21 operated in parallel, and as the reference effective value Vr, a common constant value is given to the plurality of power conversion devices 21.

The reactive power calculator 320 receives the output current Io, the output voltage Vc, the cosine wave cos φ, and the sine wave sin φ, and outputs the fundamental wave reactive power Q outputted from the power conversion device 21. The fundamental wave reactive power Q is reactive power of a component having the frequency of the internal phase φ and contained in output of the power conversion device 21. In calculation of the fundamental wave reactive power Q, it suffices that the polarity and the magnitude of reactive power having a specific frequency can be calculated. Here, as shown by the following Expression (1), the fundamental wave reactive power Q is calculated from a result of discrete Fourier transform of output voltage Vc and output current Io with respect to the internal phase φ component.

[Mathematical 1]

$$Vc\sin = \frac{Tc \times \sqrt{2}}{Tvc} \times \sum_{n=1}^{m} (Vcn \times \sin\varphi n)$$

$$Vc\cos = \frac{Tc \times \sqrt{2}}{Tvc} \times \sum_{n=1}^{m} (Vcn \times \cos\varphi n)$$

$$Io\sin = \frac{Tc \times \sqrt{2}}{Tvc} \times \sum_{n=1}^{m} (Ion \times \sin\varphi n)$$

$$Io\cos = \frac{Tc \times \sqrt{2}}{Tvc} \times \sum_{n=1}^{m} (Ion \times \cos\varphi n)$$

$$Q = Vc\sin \times Io\cos - Vc\cos \times Io\sin$$

(1)

Here, Tvc is the cycle of output voltage Vc, Tc is the calculation cycle, m is the number of calculations in which processing with a calculation cycle of Tc is performed during the cycle Tvc, n is a calculation number counted from zero-crossing of Vc (1 corresponds to the oldest value, m corresponds to the latest value, and n corresponds to the present value), Vcn is the present value of output voltage Vc, Ion is the present value of output current Io, φn is the present internal phase, Vc sin is a fundamental sine-wave effective value component of Vc, Vc cos is a fundamental cosine-wave effective value component of Vc, Io sin is a fundamental sine-wave effective value component of Io, and Io cos is a fundamental cosine-wave effective value component of Io. As for the fundamental wave reactive power Q, the polarity when the power conversion device 21 outputs reactive power with a leading phase is defined as positive.

The droop characteristic calculator 321 receives the fundamental wave reactive power Q, and calculates and outputs the correction amount ΔVr so as to reduce the fundamental wave reactive power Q outputted from the power conversion device 21. Specifically, a value obtained by multiplying the fundamental wave reactive power Q by a gain Kq becomes the correction amount ΔVr (ΔVr=Q×Kq).

Here, in the case where the gain Kg is set so that a correction amount ΔVr of 0.05 p.u. is outputted relative to fundamental wave reactive power Q of 1 p.u., this state is equivalent to a state in which a reactance (inductance) component corresponding to 0.05 p.u. relative to the fundamental wave component is connected between the switching element unit 2 (including inside) and the output terminal 9.

For example, in the case of power conversion device with 200 Vrms and rating of 1 kVA, the gain Kq is set at 0.01 Vrms/Var (200 Vrms×0.05 p.u./(1 kVA×1 p.u.)=0.01 Vrms/Var). Thus, the correction amount ΔVr is outputted so as to cause voltage drop equivalent to that caused when a reactance of 2Ω (200 Vrms×200 Vrms×0.05 p.u./1 kVA=2Ω) is connected between the switching element unit 2 (including inside) and the filter capacitor 4.

Therefore, in the case where the plurality of power conversion devices 21 are operated in parallel, if cross current of fundamental wave reactive power between the power conversion devices 21 is great, the gain Kq is set to be great. Thus, voltage error between the power conversion devices 21 reduces, so that cross current of fundamental wave reactive power can be reduced. In the case where allocations of fundamental wave reactive power to the power conversion devices 21 are different due to the wiring impedance or the like of each power conversion device 21, the gain Kq may be adjusted for each power conversion device 21. The gain Kq may be set considering the above circumstances.

The reference voltage commander 322 outputs the reference effective value Vr. As described above, in the case where the plurality of power conversion devices 21 perform parallel operations, the reference effective value Vr is the same for all the power conversion devices 21.

The adder 323 adds the correction amount ΔVr to the reference effective value Vr, thereby outputting the effective voltage command Vr* (Vr*=Vr*+ΔVr).

When the plurality of power conversion devices 21 perform parallel operations, if the voltage amplitude of the fundamental wave component of output voltage Vc varies between the power conversion devices 21, error voltage due to the variation is applied to the output reactor 5 and current due to the error voltage flows between the power conversion devices 21. In particular, the error voltage due to error of the voltage amplitude is mainly constituted of a sine-wave component, and therefore sine-wave component voltage is applied to the output reactor 5, so that cosine-wave component current flows between the power conversion devices 21. That is, in terms of power, reactive power flows as cross current between the power conversion devices 21.

Figure 6:
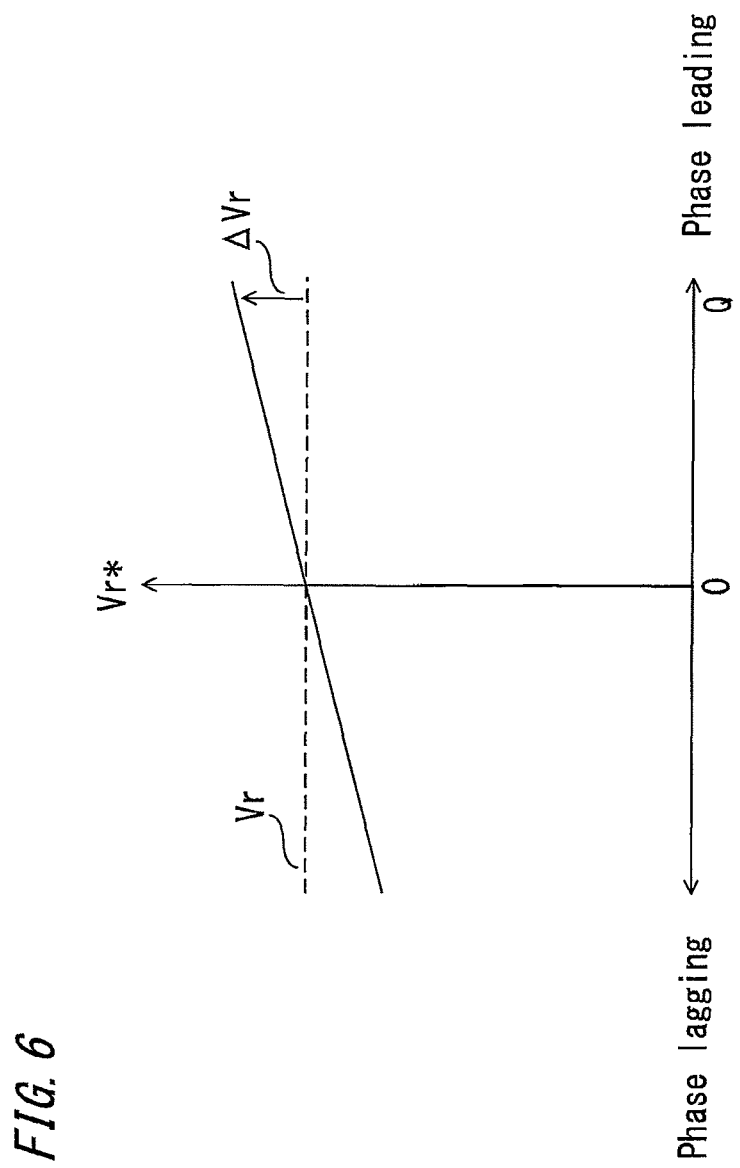
FIG. 6 illustrates an effective voltage command outputted from the effective voltage commander in FIG. 5.

In the present embodiment, as described above, the effective voltage commander 30 includes the droop characteristic calculator 321 and thereby generates the effective voltage command Vr* having a droop characteristic with respect to the fundamental wave reactive power Q so as to reduce the fundamental wave reactive power Q. As shown in FIG. 6, the effective voltage command Vr* is obtained by adding a droop characteristic (correction amount ΔVr) with respect to the fundamental wave reactive power Q, to the reference effective value Vr.

Figure 7:
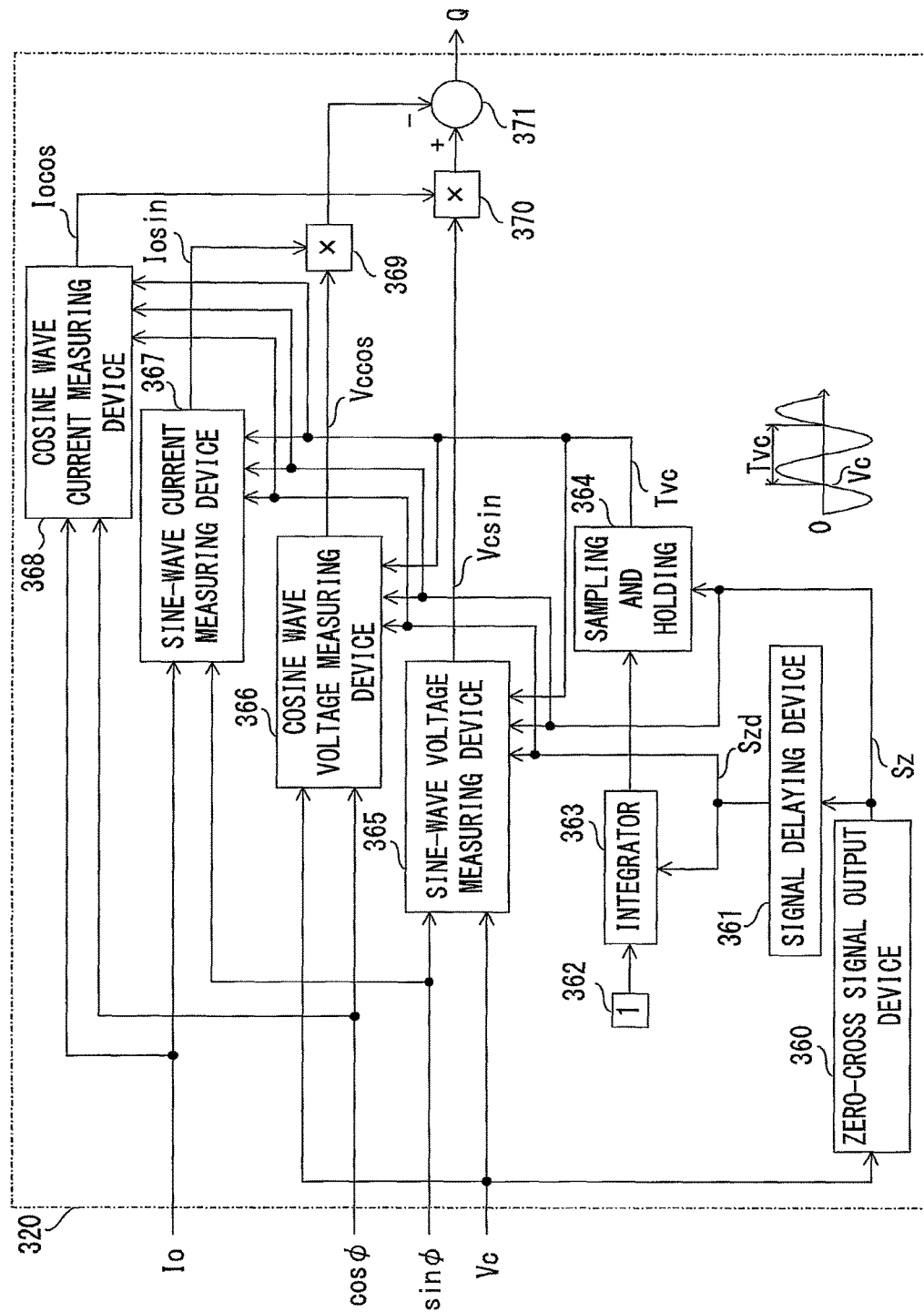
FIG. 7 is a block diagram showing the internal configuration of a reactive power calculator included in the effective voltage commander in FIG. 5.

FIG. 7 is a block diagram showing the internal configuration of the reactive power calculator 320 included in the effective voltage commander 30.

The reactive power calculator 320 receives the output current Io, the output voltage Vc, the sine wave sin φ, and the cosine wave cos φ, calculates the fundamental wave reactive power Q through calculation shown by the above Expression (1), and outputs the fundamental wave reactive power Q.

The reactive power calculator 320 includes a zero-cross signal output device 360, a signal delaying device 361, a fixed signal output device 362, an integrator 363, a sampling-and-holding device 364, a sine-wave voltage measuring device 365, a cosine wave voltage measuring device 366, a sine-wave current measuring device 367, a cosine wave current measuring device 368, multipliers 369, 370, and a subtractor 371. In the following description regarding signals, positive and negative signals are used. However, Hi and Lo signals may be used, for example.

In FIG. 7, Sz is a zero-cross signal, and Szd is a delayed zero-cross signal.

The zero-cross signal output device 360 receives output voltage Vc. Then, if the output voltage Vc is positive, the zero-cross signal output device 360 outputs a positive zero-cross signal Sz, and if the output voltage Vc is negative, the zero-cross signal output device 360 outputs a negative zero-cross signal Sz. At this time, due to variation in the output voltage Vc, zero-crossing might be detected a plurality of times within a short time period (for example, shorter than 5 ms) (chattering). As measures for such chattering, after zero-crossing is detected, detection of zero-crossing may be masked (the zero-cross signal Sz may be prevented from changing) during a certain time period (for example, 5 ms). In addition, hysteresis may be provided for the positive/negative determination of output voltage Vc (for example, when output voltage Vc is 1 V or higher, output voltage Vc may be determined to be positive, and when output voltage Vc is −1 V or lower, output voltage Vc may be determined to be negative).

The signal delaying device 361 receives the zero-cross signal Sz and outputs the delayed zero-cross signal Szd which is delayed by a signal corresponding to one calculation step of the reactive power calculator 320. The signal delaying device 361 provides a delay between the signal (zero-cross signal Sz) for sampling and holding, and a signal (delayed zero-cross signal Szd) for resetting the integrator. Thus, the order of sampling-and-holding operation performed in accordance with the zero-cross signal Sz and operation of resetting the integrator is ensured.

The fixed signal output device 362 outputs a fixed value that is a signal value "1". This signal is accumulated by the integrator 363, to obtain an elapsed time of measurement of the cycle of output voltage Vc.

The integrator 363 receives output of the fixed signal output device 362 and the delayed zero-cross signal Szd, and outputs a cycle measurement value of output voltage Vc obtained by integrating output of the fixed signal output device 362. When the delayed zero-cross signal Szd changes from negative to positive, the integrator 363 resets the integral value to 0 and integrates output of the fixed signal output device 362. In the integration, a value obtained by multiplying a calculation step period by output of the fixed signal output device 362 is accumulated every calculation step. Thus, output of the integrator 363 becomes an elapsed time since the timing at which the delayed zero-cross signal Szd changed from negative to positive.

The sampling-and-holding device 364 receives output of the integrator 363 and the zero-cross signal Sz, and outputs the cycle Tvc of output voltage Vc. The sampling-and-holding device 364 updates output of the sampling-and-holding device 364 to output of the integrator 363 at a timing at which the zero-cross signal Sz changes from negative to positive. Output of the sampling-and-holding device 364 does not change at the other timings. Through this operation, a cycle with which output voltage Vc changes from negative to positive can be measured.

The sine-wave voltage measuring device 365 receives the output voltage Vc, the sine wave sin φ, the cycle Tvc of output voltage Vc, the zero-cross signal Sz, and the delayed zero-cross signal Szd, and calculates a sine wave sin φ component of the output voltage Vc, thereby outputting the fundamental sine-wave effective value component Vc sin of output voltage Vc.

The cosine wave voltage measuring device 366 receives the output voltage Vc, the cosine wave cos φ, the cycle Tvc of output voltage Vc, the zero-cross signal Sz, and the delayed zero-cross signal Szd, and calculates a cosine wave cos (component of the output voltage Vc, thereby outputting the fundamental cosine-wave effective value component Vc cos of output voltage Vc.

The sine-wave current measuring device 367 receives the output current Io, the sine wave sin φ, the cycle Tvc of output voltage Vc, the zero-cross signal Sz, and the delayed zero-cross signal Szd, and calculates a sine wave sin φ component of the output current Io, thereby outputting the fundamental sine-wave effective value component Io sin of output current Io.

The cosine wave current measuring device 368 receives the output current Io, the cosine wave cos φ, the cycle Tvc of the output voltage Vc, the zero-cross signal Sz, and the delayed zero-cross signal Szd, and calculates a cosine wave cos φ component of the output current Io, thereby outputting the fundamental cosine-wave effective value component Io cos of output current Io.

The multiplier 369 receives the fundamental cosine-wave effective value component Vc cos of output voltage Vc and the fundamental sine-wave effective value component Io sin of output current Io, and outputs a result (Vc cos×Io sin) of multiplication of these values. In addition, the multiplier 370 receives the fundamental sine-wave effective value component Vc sin of output voltage Vc and the fundamental cosine-wave effective value component Io cos of output current Io, and outputs a result (Vc sin×Io cos) of multiplication of these values. Further, the subtractor 371 subtracts output of the multiplier 369 from output of the multiplier 370, that is, outputs the fundamental wave reactive power Q through calculation shown by the above Expression (1).

Figure 8:
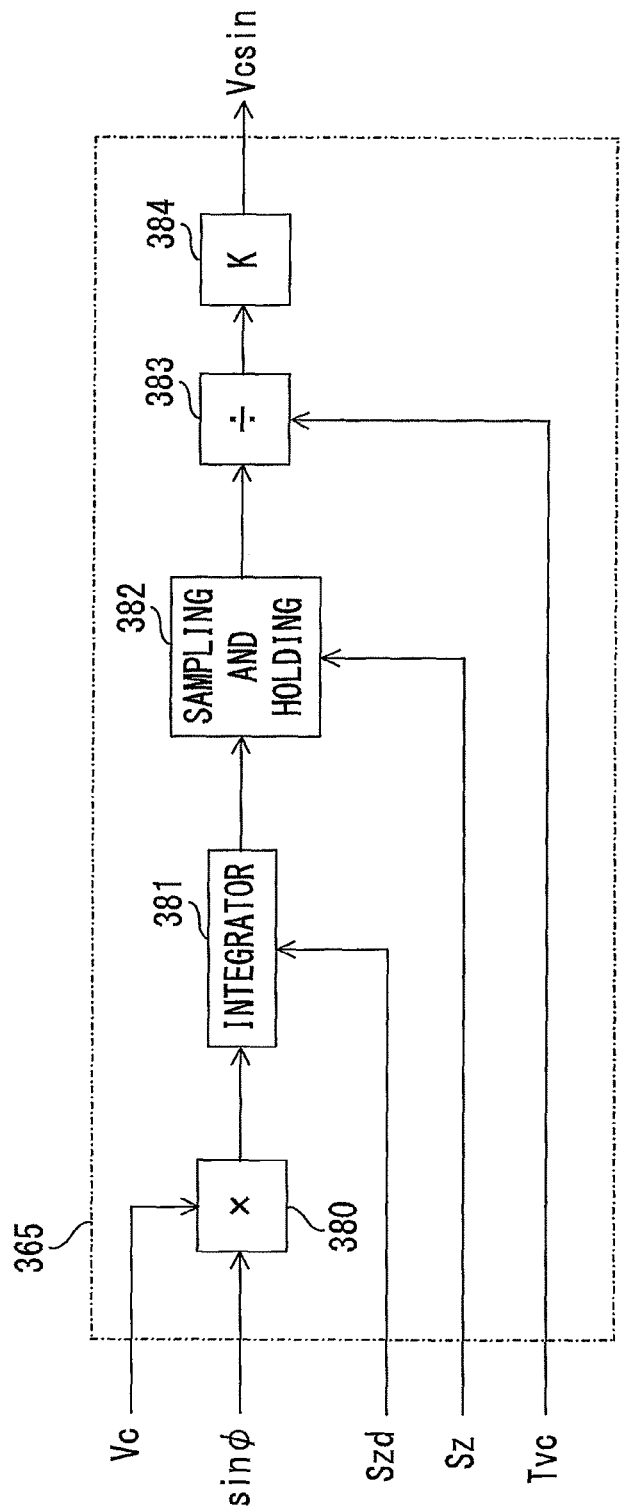
FIG. 8 is a block diagram showing the internal configuration of a sine-wave voltage measuring device included in the reactive power calculator in FIG. 7.

FIG. 8 is a block diagram showing the internal configuration of the sine-wave voltage measuring device 365 included in the reactive power calculator 320.

The sine-wave voltage measuring device 365 receives the output voltage Vc, the sine wave sin φ, the cycle Tvc of output voltage Vc, the zero-cross signal Sz, and the delayed zero-cross signal Szd, and performs calculation of Vc sin shown in the above Expression (1), thereby outputting the fundamental sine-wave effective value component Vc sin of output voltage Vc.

The sine-wave voltage measuring device 365 includes a multiplier 380, an integrator 381, a sampling-and-holding device 382, a divider 383, and a gain 384.

The multiplier 380 receives the output voltage Vc and the sine wave sin φ, and outputs a result (Vc×sin φ) of multiplication of these values.

The integrator 381 receives output of the multiplier 380 and the delayed zero-cross signal Szd, and outputs a value obtained by accumulating output of the multiplier 380. Here, the integrator 381 accumulates a value obtained by multiplying a calculation step period by output of the multiplier 380, every calculation step, and the integral value thereof is reset at a timing at which the delayed zero-cross signal Szd changes from negative to positive.

The sampling-and-holding device 392 receives output of the integrator 381 and the zero-cross signal Sz, and updates output of the sampling-and-holding device 392 to output of the integrator 381 at a timing at which the zero-cross signal Sz changes from negative to positive. Output of the sampling-and-holding device 392 does not change at the other timings.

The divider 383 receives output of the sampling-and-holding device 392 and the cycle Tvc of output voltage Vc, and outputs a result of dividing output of the sampling-and-holding device 392 by the cycle Tvc of output voltage Vc. For the divider 383, a lower limit value may be set for the cycle Tvc of output voltage Vc so as to prevent division by 0 when the cycle Tvc of output voltage Vc is 0.

The gain 384 receives output of the divider 383 and multiplies output of the divider 383 by √2, thereby outputting the fundamental sine-wave effective value component Vc sin.

Figure 9:
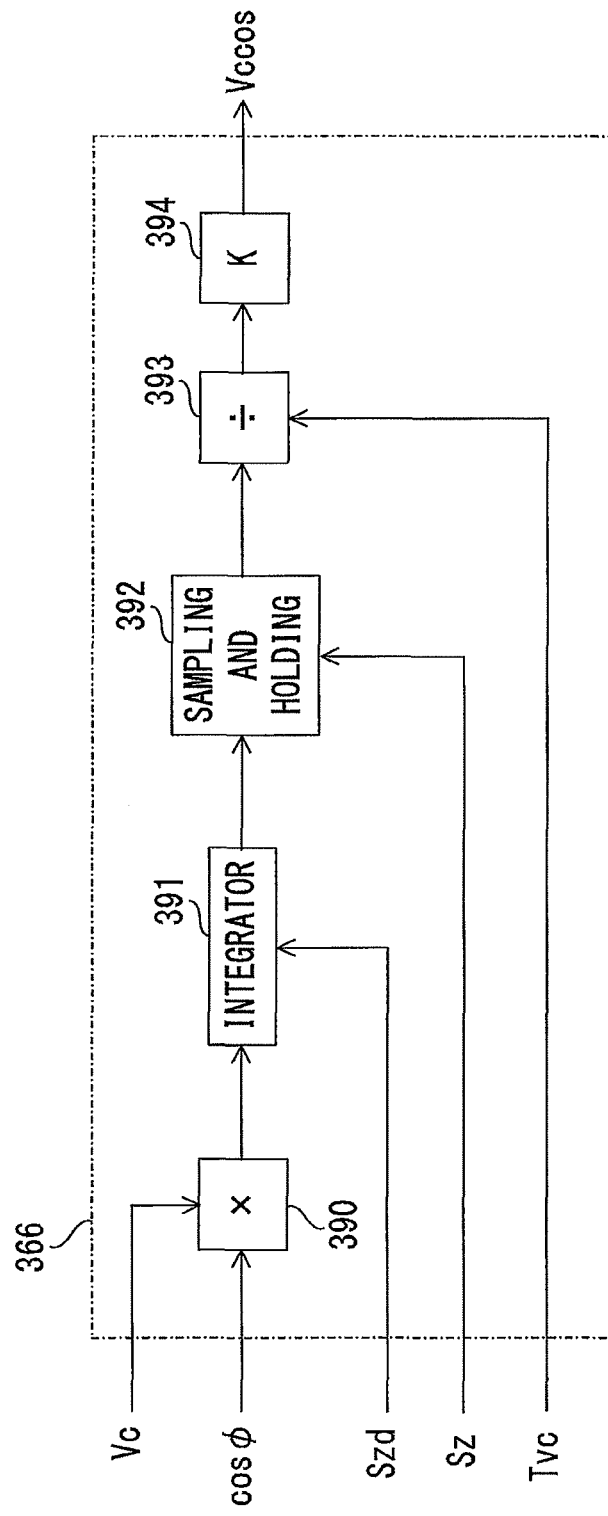
FIG. 9 is a block diagram showing the internal configuration of a cosine wave voltage measuring device included in the reactive power calculator in FIG. 7.

FIG. 9 is a block diagram showing the internal configuration of the cosine wave voltage measuring device 366 included in the reactive power calculator 320.

The cosine wave voltage measuring device 366 receives the output voltage Vc, the cosine wave cos φ, the cycle Tvc of output voltage Vc, the zero-cross signal Sz, and the delayed zero-cross signal Szd, and performs calculation of Vc cos shown in the above Expression (1), thereby outputting the fundamental cosine-wave effective value component Vc cos of output voltage Vc.

The cosine wave voltage measuring device 366 includes a multiplier 390, an integrator 391, a sampling-and-holding device 392, a divider 393, and a gain 394.

It is noted that the calculation of the fundamental cosine-wave effective value component Vc cos is the same as calculation obtained by changing, to cos φ, the input sin φ in the calculation of the fundamental sine-wave effective value component Vc sin described in FIG. 8. Therefore, the description thereof is omitted.

Figure 10:
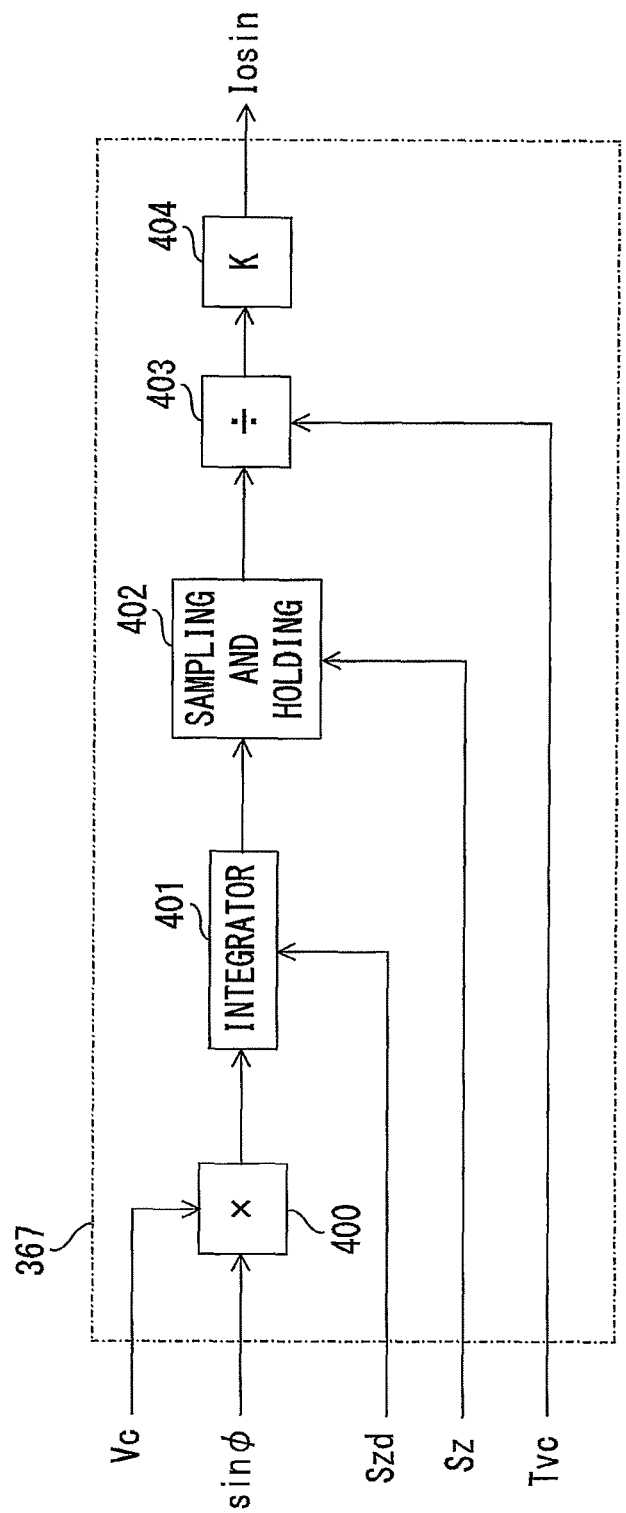
FIG. 10 is a block diagram showing the internal configuration of a sine-wave current measuring device included in the reactive power calculator in FIG. 7.

FIG. 10 is a block diagram showing the internal configuration of the sine-wave current measuring device 367 included in the reactive power calculator 320.

The sine-wave current measuring device 367 receives the output current Io, the sine wave sin φ, the cycle Tvc of output voltage Vc, the zero-cross signal Sz, and the delayed zero-cross signal Szd, and performs calculation of Io sin shown in the above Expression (1), thereby outputting the fundamental sine-wave effective value component Io sin of output current Io.

The sine-wave current measuring device 367 includes a multiplier 400, an integrator 401, a sampling-and-holding device 402, a divider 403, and a gain 404.

It is noted that the calculation of the fundamental sine-wave effective value component Io sin is the same as calculation obtained by changing, to Io, the input Vc in the calculation of the fundamental sine-wave effective value component Vc sin of output voltage Vc described in FIG. 8. Therefore, the description thereof is omitted.

Figure 11:
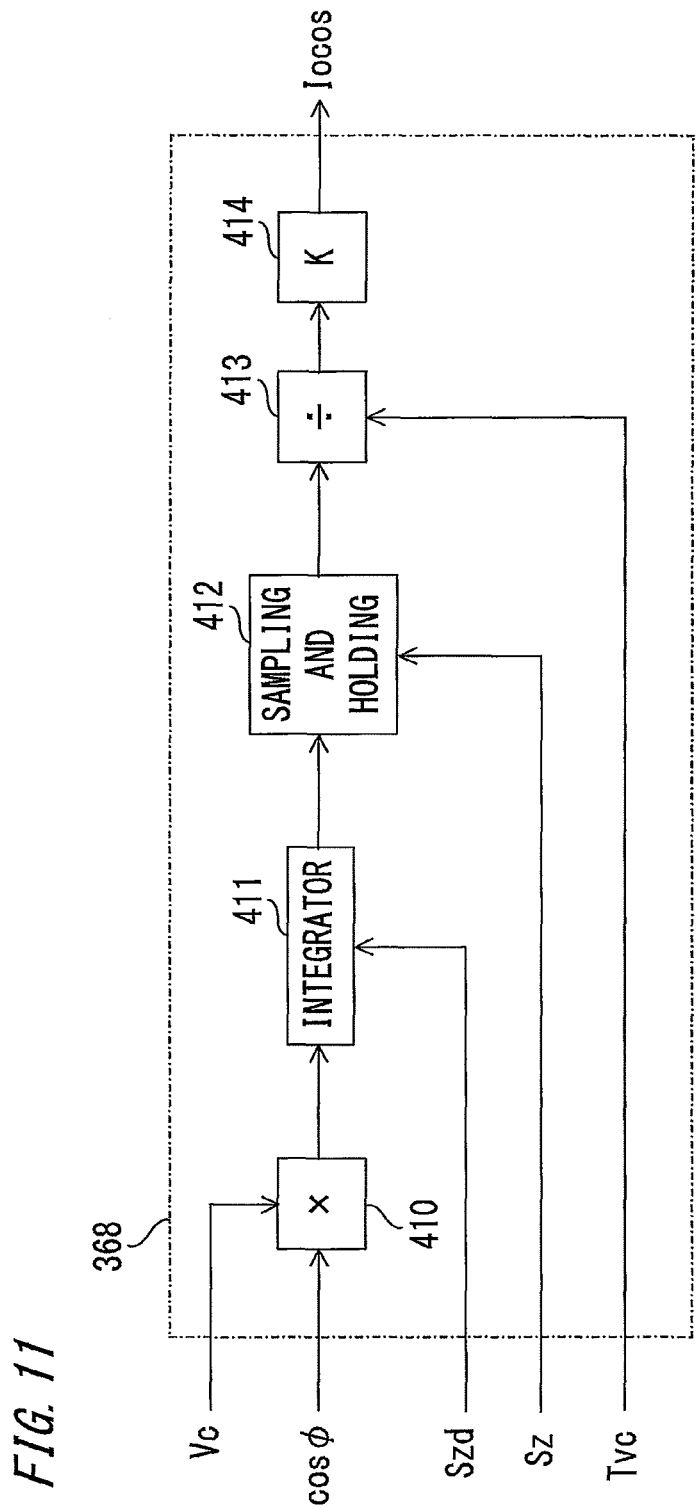
FIG. 11 is a block diagram showing the internal configuration of a cosine wave current measuring device included in the reactive power calculator in FIG. 7.

FIG. 11 is a block diagram showing the internal configuration of the cosine wave current measuring device 368 included in the reactive power calculator 320.

The cosine wave current measuring device 368 receives the output current Io, the cosine wave cos φ, the cycle Tvc of output voltage Vc, the zero-cross signal Sz, and the delayed zero-cross signal Szd, and performs calculation of Io cos shown in the above Expression (1), thereby outputting the fundamental cosine-wave effective value component Io cos of output current Io.

The cosine wave current measuring device 368 includes a multiplier 410, an integrator 411, a sampling-and-holding device 412, a divider 413, and a gain 414.

It is noted that the calculation of the fundamental cosine-wave effective value component Io cos is the same as calculation obtained by changing, to Io, the input Vc in the calculation of the fundamental cosine-wave effective value component Vc cos of output voltage Vc described in FIG. 9. Therefore, the description thereof is omitted.

Figure 12:
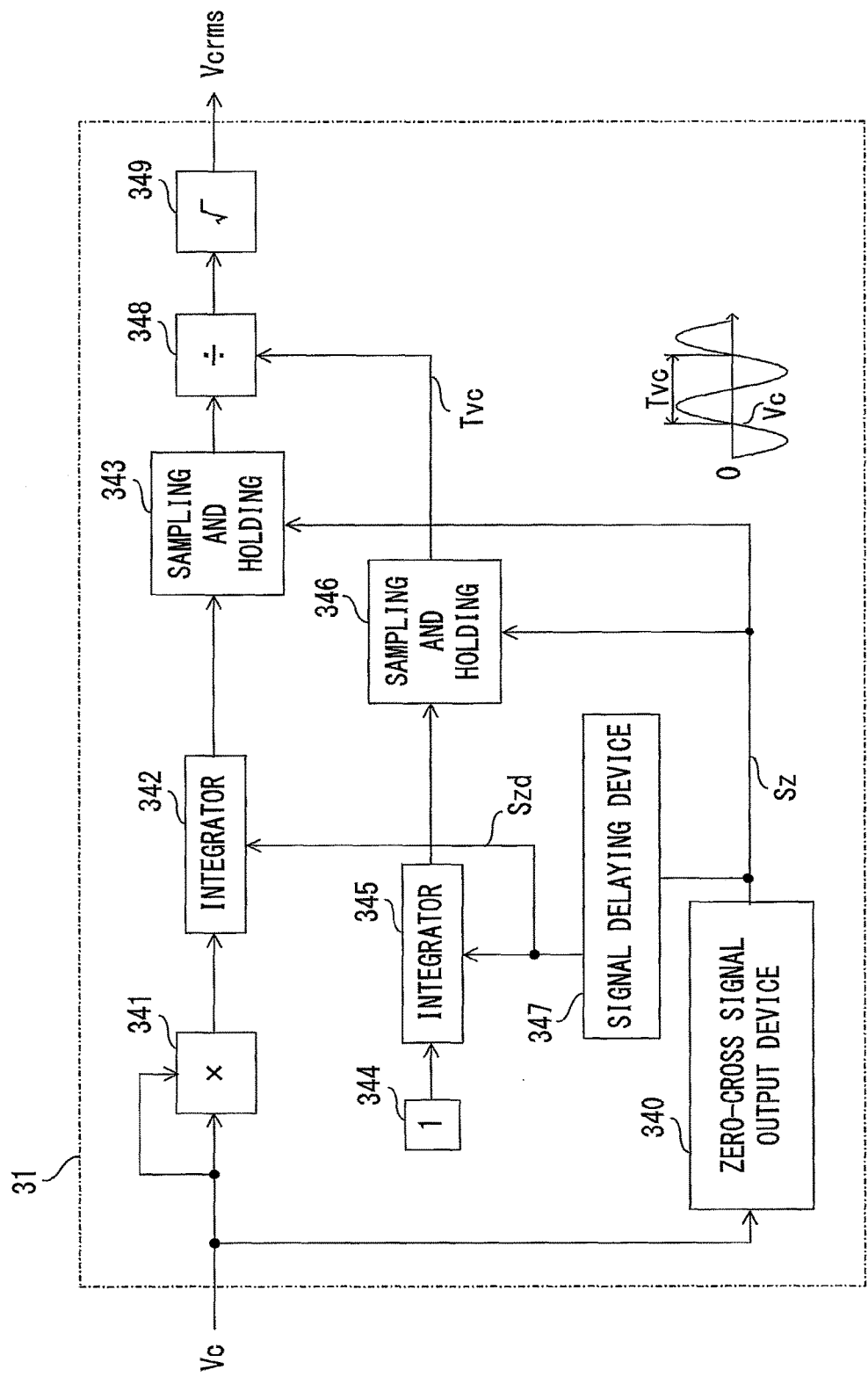
FIG. 12 is a block diagram showing the internal configuration of an effective value calculator included in the voltage command generation unit in FIG. 4.

FIG. 12 is a block diagram showing the internal configuration of the effective value calculator 31 included in the voltage command generation unit 11.

The effective value calculator 31 receives output voltage Vc and outputs the voltage effective value Vcrms of output voltage Vc. The effective value calculator 31 includes a zero-cross signal output device 340, a multiplier 341, integrators 342, 345, sampling-and-holding devices 343, 346, a fixed signal output device 344, a signal delaying device 347, a divider 348, and a square-root device 349.

The effective value calculator 31 performs calculation of the voltage effective value Vcrms as shown by the following Expression (2).

[Mathematical 2]

$$Vcrms = \sqrt{\frac{Tc}{Tvc} \times \sum_{n=1}^{m}(Vcn \times Vcn)} \qquad (2)$$

Here, Tvc is the cycle of output voltage Vc, Tc is the calculation cycle, m is the number of calculations in which processing with a calculation cycle of Tc is performed during the cycle Tvc, n is a calculation number counted from zero-crossing of Vc (1 corresponds to the oldest value, m corresponds to the latest value, and n corresponds to the present value), and Vcn is the present value of output voltage Vc.

The zero-cross signal output device 340 receives the output voltage Vc. Then, if the output voltage Vc is positive, the zero-cross signal output device 340 outputs a positive zero-cross signal Sz, and if the output voltage Vc is negative, the zero-cross signal output device 340 outputs a negative zero-cross signal Sz. At this time, due to variation in the output voltage Vc, zero-crossing might be detected a plurality of times within a short time period (for example, shorter than 5 ms) (chattering). As measures for such chattering, after zero-crossing is detected, detection of zero-crossing may be masked (the zero-cross signal Sz may be prevented from changing) during a certain time period (for example, 5 ms). In addition, hysteresis may be provided for the positive/negative determination of output voltage Vc (for example, when output voltage Vc is 1 V or higher, output voltage Vc may be determined to be positive, and when output voltage Vc is −1 V or lower, output voltage Vc may be determined to be negative).

The signal delaying device 347 receives the zero-cross signal Sz and outputs the delayed zero-cross signal Szd which is delayed by a signal corresponding to one calculation step of the effective value calculator 31. The signal delaying device 347 provides a delay between the signal (zero-cross signal Sz) for sampling and holding, and a signal (delayed zero-cross signal Szd) for resetting the integrator. Thus, the order of integrator-output sampling-and-holding operation performed in accordance with the zero-cross signal Sz and operation of resetting the integrator is ensured.

The fixed signal output device 344 outputs a fixed value that is a signal value "1". This signal is accumulated by the integrator 345, to obtain an elapsed time of measurement of the cycle of output voltage Vc.

The integrator 345 receives output of the fixed signal output device 344 and the delayed zero-cross signal Szd, and outputs a cycle measurement value of output voltage Vc obtained by integrating output of the fixed signal output device 344. When the delayed zero-cross signal Szd changes from negative to positive, the integrator 345 resets the integral value to 0 and integrates output of the fixed signal output device 344. In the integration, a value obtained by multiplying a calculation step period by output of the fixed signal output device 344 is accumulated every calculation step. Thus, output of the integrator 345 becomes an elapsed time since the timing at which the delayed zero-cross signal Szd changed from negative to positive.

The sampling-and-holding device 346 receives output of the integrator 345 and the zero-cross signal Sz, and outputs the cycle Tvc of output voltage Vc. The sampling-and-holding device 346 updates output of the sampling-and-holding device 346 to output of the integrator 345 at a timing at which the zero-cross signal Sz changes from negative to positive. Output of the sampling-and-holding device 346 does not change at the other timings. Through this operation, a cycle with which output voltage Vc changes from negative to positive can be measured.

The multiplier 341 receives the output voltage Vc and outputs the square (Vc×Vc) of the output voltage Vc.

The integrator 342 receives output of the multiplier 341 and the delayed zero-cross signal Szd, and outputs a value obtained by accumulating output of the multiplier 341. Here, the integrator 342 accumulates a value obtained by multiplying a calculation step period by output of the multiplier 341, every calculation step, and the integral value thereof is reset at a timing at which the delayed zero-cross signal Szd changes from negative to positive.

The sampling-and-holding device 343 receives output of the integrator 342 and the zero-cross signal Sz, and updates output of the sampling-and-holding device 343 to output of the integrator 342 at a timing at which the zero-cross signal Sz changes from negative to positive. Output of the sampling-and-holding device 343 does not change at the other timings.

The divider 348 receives output of the sampling-and-holding device 343 and the cycle Tvc of output voltage Vc, and outputs a result of dividing output of the sampling-and-holding device 343 by the cycle Tvc of output voltage Vc.

For the divider 348, a lower limit value may be set for the cycle Tvc of output voltage Vc so as to prevent division by 0 when the cycle Tvc of output voltage Vc is 0.

The square-root device 349 receives output of the divider 348 and calculates the square root of output of the divider 348, thereby outputting the voltage effective value Vcrms of output voltage Vc.

The divider 348 is to output a real number, and if output of the divider 348 is equal to or smaller than 0, output of the square-root device 349 becomes an imaginary number. Therefore, a lower limit value (for example, lower limit value is 0) may be set for input of the divider 348.

Figure 13:
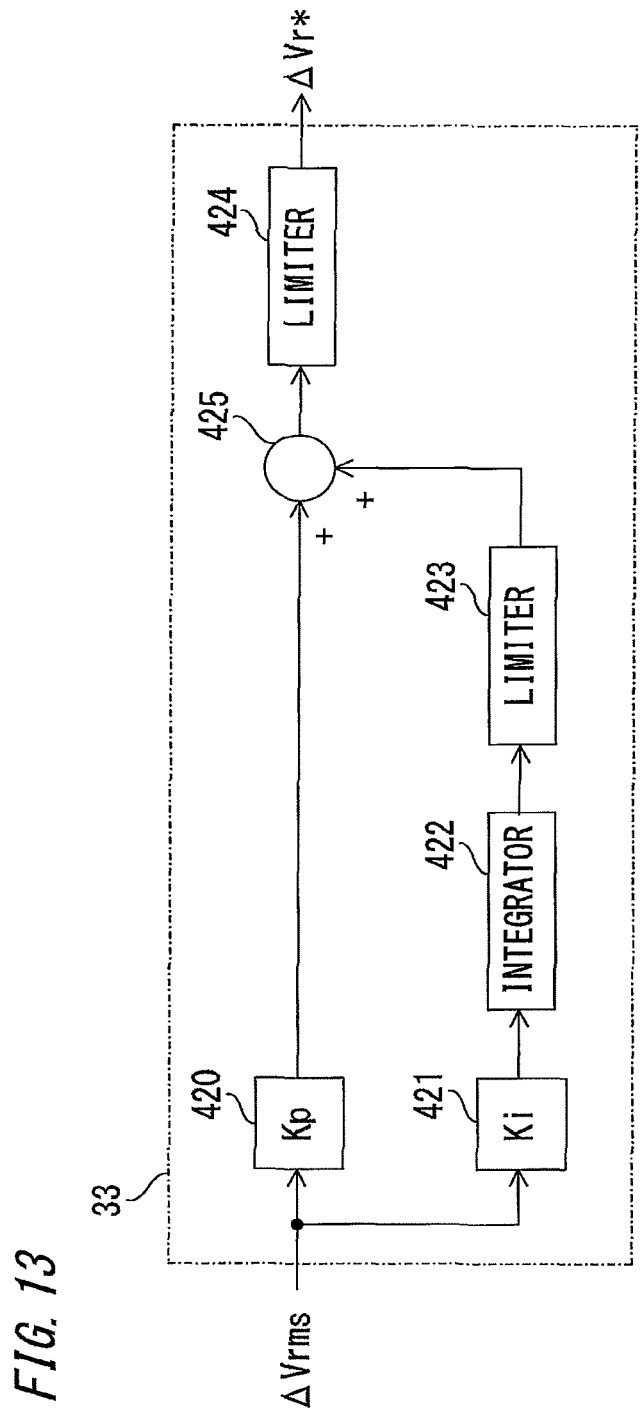
FIG. 13 is a block diagram showing the internal configuration of a voltage controller included in the voltage command generation unit in FIG. 4.

FIG. 13 is a block diagram showing the internal configuration of the voltage controller 33 included in the voltage command generation unit 11.

The voltage controller 33 receives the error $\Delta Vrms$ obtained by subtracting the voltage effective value Vcrms from the effective voltage command Vr*, and outputs the control quantity $\Delta Vr^*$ so that the error $\Delta Vrms$ approaches 0.

The voltage controller 33 includes a proportional gain (Kp) 420, an integral gain (Ki) 421, an integrator 422, limiters 423, 424, and an adder 425.

As described above, the voltage controller 33 corrects the effective value of voltage outputted from the power conversion device 21, and specifically, corrects an error of the output voltage effective value that occurs due to voltage drop of the filter reactor 3.

The proportional gain 420 and the integral gain 421 of the voltage controller 33 may be set so as to stabilize operation of the voltage controller 33 and obtain a desired response. The limiters 423, 424 may be set to be greater than a voltage variation width assumed in the power conversion device 21. The limiter 423 and the limiter 424 may be set to the same value. For example, in the case where the output voltage range of the power conversion device 21 is 180 Vrms to 220 Vrms with a rating of 200 Vrms and the voltage variation thereof is in a range of −20 Vrms to 20 Vrms, the limiters 423, 424 are set so as to output values in a range of −30 Vrms to 30 Vrms.

Here, an example in which the voltage controller 33 is configured as a PI controller is shown, but the voltage controller 33 is not limited thereto. For example, the voltage controller 33 may be configured as a proportional controller or configured by connecting a proportional controller and a low-pass filter in series.

The proportional gain 420 receives the error $\Delta Vrms$ and outputs a result ($\Delta Vrms \times Kp$) obtained by multiplying the error $\Delta Vrms$ by a proportional gain Kp.

The integral gain 421 receives the error $\Delta Vrms$ and outputs a result ($\Delta Vrms \times Ki$) obtained by multiplying the error $\Delta Vrms$ by an integral gain Ki.

The integrator 422 receives output of the integral gain 421, accumulates a value obtained by multiplying a calculation step period by output of the integral gain 421, every calculation step, and outputs a result of the integration. Although not shown, the cumulative value of the integrator 422 is limited by an upper limit value or a lower limit value of the limiter 423 connected at a stage subsequent to the integrator 422.

The limiter 423 has an upper limit value and a lower limit value, and receives output of the integrator 422. If the received value is greater than the upper limit value of the limiter 423, the limiter 423 outputs the upper limit value, and if the received value is smaller than the lower limit value, the limiter 423 outputs the lower limit value. In the other cases, the limiter 423 outputs the received value.

The adder 425 receives output of the proportional gain 420 and output of the limiter 423, and outputs a result of adding these received values.

The limiter 424 has an upper limit value and a lower limit value, and receives output of the adder 425. If the received value is greater than the upper limit value of the limiter 424, the limiter 424 outputs the upper limit value, and if the received value is smaller than the lower limit value, the limiter 424 outputs the lower limit value. In the other cases, the limiter 424 outputs the received value.

Returning to FIG. 3, the voltage correction amount calculation unit 12 calculates the correction amount VL* for the voltage command Vref generated by the voltage command generation unit 11, on the basis of reactor current IL detected by the reactor current detection unit 6. The correction amount VL* for the voltage command corresponds to a phenomenon that voltage drop due to impedance occurs between the switching element unit 2 and the filter reactor 3. An example of calculation of the correction amount VL* for the voltage command by the voltage correction amount calculation unit 12 is shown by the following Expression (3).

[Mathematical 3]

$$VL*= Lset \times \frac{d}{dt}IL + Rset \times IL \quad (3)$$

Here, VL* is a voltage command correction amount calculated by the voltage correction amount calculation unit 12, IL is reactor current detected by the reactor current detection unit 6, Lset is an inductance component gain, and Rset is a resistance component gain.

Figure 14:
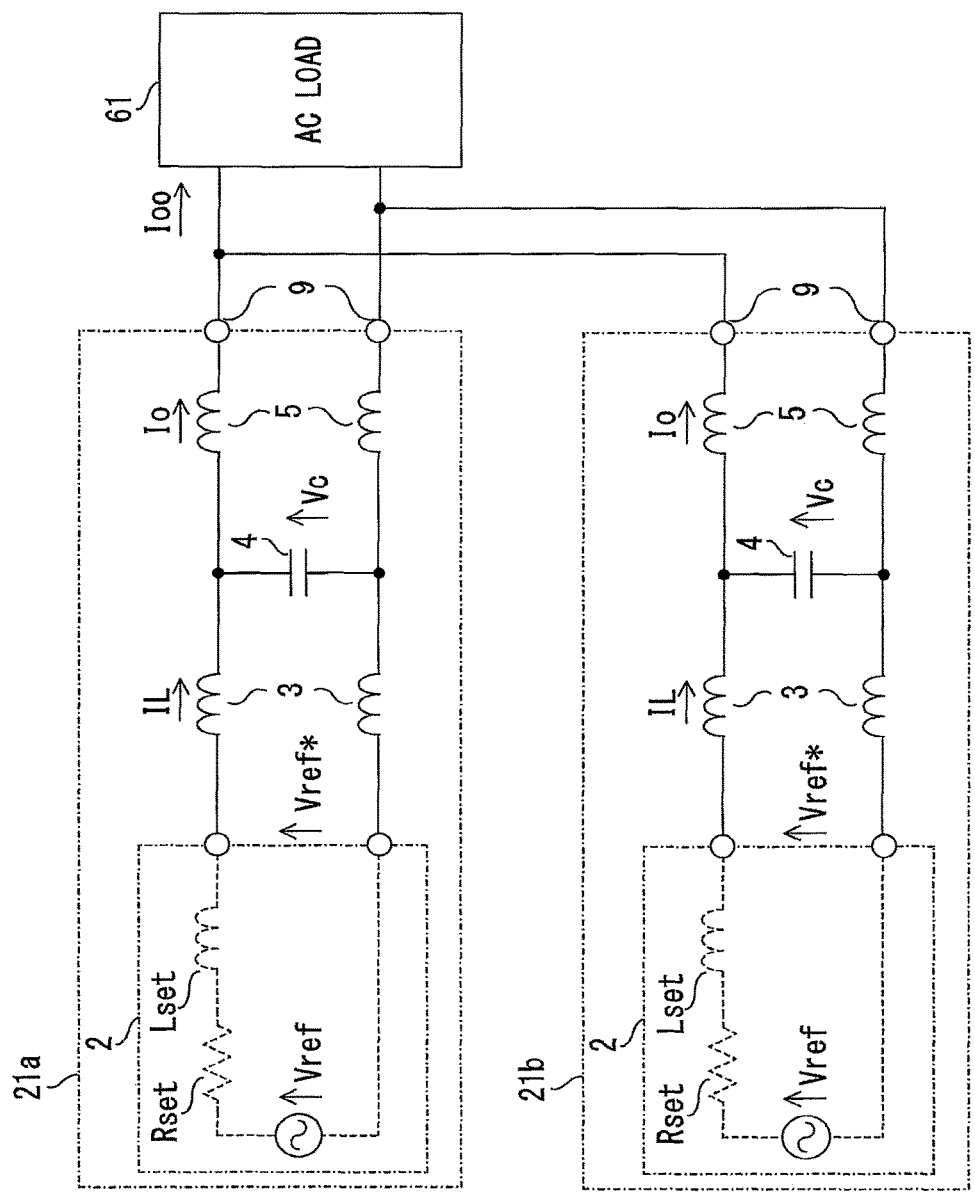
FIG. 14 illustrates a virtual resistance and a virtual inductance in the power conversion device according to embodiment 1 of the present invention.

Specifically, as shown in FIG. 14, operation is performed such that a virtual resistance Rset and a virtual inductance Lset are present inside the switching element unit 2 of the power conversion device 21 (21a, 21b). Thus, the above Expression (3) represents voltage drop in the case where the inductance Lset and the resistance Rset are connected in series and current IL flows. The first term on the right-hand side of Expression (3) corresponds to voltage drop in the inductance Lset and the second term on the right-hand side of Expression (3) corresponds to voltage drop in the resistance Rset.

Here, description will be given under the assumption that the virtual resistance Rset and the virtual inductance Lset are present inside the switching element unit 2 of the power conversion device 21. However, without limitation thereto, the same applies even if it is assumed that the virtual resistance Rset and the virtual inductance Lset are present between the switching element unit 2 and the filter reactor 3 of the power conversion device 21.

The resistance component gain Rset may be selected so as to prevent resonance of the filter reactor 3, the filter capacitor 4, and the virtual inductance due to the inductance component gain Lset. In addition, the resistance component gain Rset may be selected so that DC current outputted from the power conversion device 21 can be reduced.

If the inductance of the filter reactor 3 is sufficiently greater than that of the output reactor 5 (for example, the inductance of the output reactor 5 is 10 uH and the inductance of the filter reactor 3 is 1 mH), the inductance component gain Lset may be selected so as to reduce variation among the filter reactors 3.

For example, in the case where the power conversion device 21a and the power conversion device 21b perform parallel operations, it is assumed that the inductance design value of the filter reactor 3 is 1 mH, whereas the inductance of the filter reactor 3 of the power conversion device 21a is 1.2 mH (deviation of 20%) and the inductance of the filter reactor 3 of the power conversion device 21b is 0.8 mH (deviation of −20%). In this case, at the time of load inrush or the like, current allocation (power allocation) to the power conversion device 21b is about 1.5 times current allocation (power allocation) to the power conversion device 21a. Here, if the inductance component gain Lset is set at 0.001, it appears that an inductance of 1 mH is connected inside the switching element unit 2 of the power conversion devices 21a, 21b. Thus, at the time of load inrush or the like, current allocation (power allocation) to the power conversion device 21b is improved to be about 1.22 times current allocation (power allocation) to the power conversion device 21a.

In this case, the inductance component gains Lset of the power conversion device 21a and the power conversion device 21b are both set at 0.001, but the inductance component gain Lset and the resistance component gain Rset can be set individually for each of the power conversion devices 21a, 21b.

As a method for differentiating the reactor current IL in the above Expression (3), for example, a method of calculating a difference between the previous value and the latest value, a method using a high-pass filter, or a method of calculating the slope by a least squares method, may be employed. As the reactor current IL in the above Expression (3), a value that has passed through a filter may be used, or a moving average value may be used. It is noted that the second term on the right-hand side of the above Expression (3) serves to prevent resonance of the filter reactor 3 and the filter capacitor 4.

The voltage command correcting unit 13 corrects the voltage command Vref outputted from the voltage command generation unit 11, in accordance with the correction amount VL* obtained by the voltage correction amount calculation unit 12, and outputs the corrected voltage command Vref* obtained by the correction, to the next PWM signal generation unit 14. An example of calculation of the corrected voltage command Vref* by the voltage command correcting unit 13 is shown by the following Expression (4).

[Mathematical 4]

$$Vref*=Vref-VL* \quad (4)$$

This Expression (4) corresponds to FIG. 14, and each switching element unit 2 is to output voltage corresponding to the corrected voltage command Vref* obtained by subtracting the correction amount VL* from the voltage command Vref. This is apparently equivalent to a state in which a power supply according to the voltage command Vref, and the virtual resistance Rset and the virtual inductance Lset that cause voltage drop corresponding to the correction amount VL*, are connected in series inside the switching element unit 2.

As described above, the voltage correction amount calculation unit 12 calculates the correction amount VL* corresponding to voltage drop due to impedance between the switching element unit 2 and the filter reactor 3. Then, the voltage command correcting unit 13 corrects the voltage command Vref outputted from the voltage command generation unit 11, using the correction amount VL*. Thus, it is possible to increase the output impedance of the power conversion device 21 in accordance with increase in reactor current IL. That is, in the case where the plurality of power conversion devices 21 perform parallel operations, correction is to be performed so as to increase the output impedance for the power conversion device 21 that has a small output impedance depending on saturation of the filter reactor 3 by load current concentration, and variation among the impedances of the filter reactor 3. Thus, it is possible to prevent concentration of power allocation (current allocation).

Furthermore, since the correction amount VL* for the voltage command calculated by the voltage correction amount calculation unit 12 is also calculated with a cycle equal to or shorter than the cycle of output voltage Vc, it is possible to balance output powers of the respective power conversion devices 21 (221a, 22b), even when instantaneous power change occurs due to variation of the AC load 61 or the like.

Figure 15:
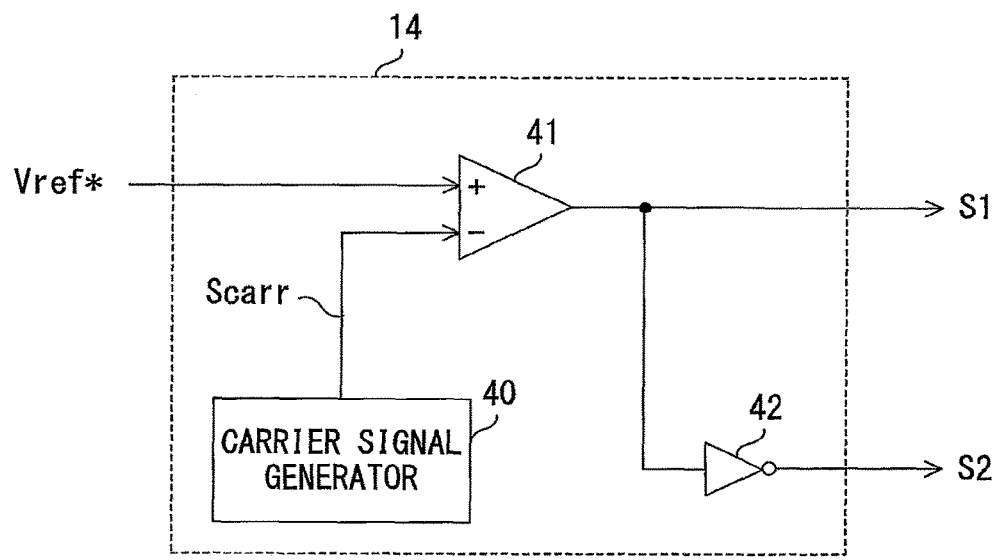
FIG. 15 is a block diagram showing the internal configuration of a PWM signal generation unit included in the control unit in FIG. 3.

FIG. 15 is a block diagram showing the internal configuration of the PWM signal generation unit 14 included in the control unit 10.

The PWM signal generation unit 14 generates a PWM signal on the basis of the corrected voltage command Vref* from the voltage command correcting unit 13 and a carrier signal Scarr, and includes a carrier signal generator 40 for generating the carrier signal Scarr, a comparator 41, and an inverting device 42. For the purpose of simplification, a short-circuit prevention time (dead time) for the switching legs, which would be set in general, is not considered.

Figure 16:
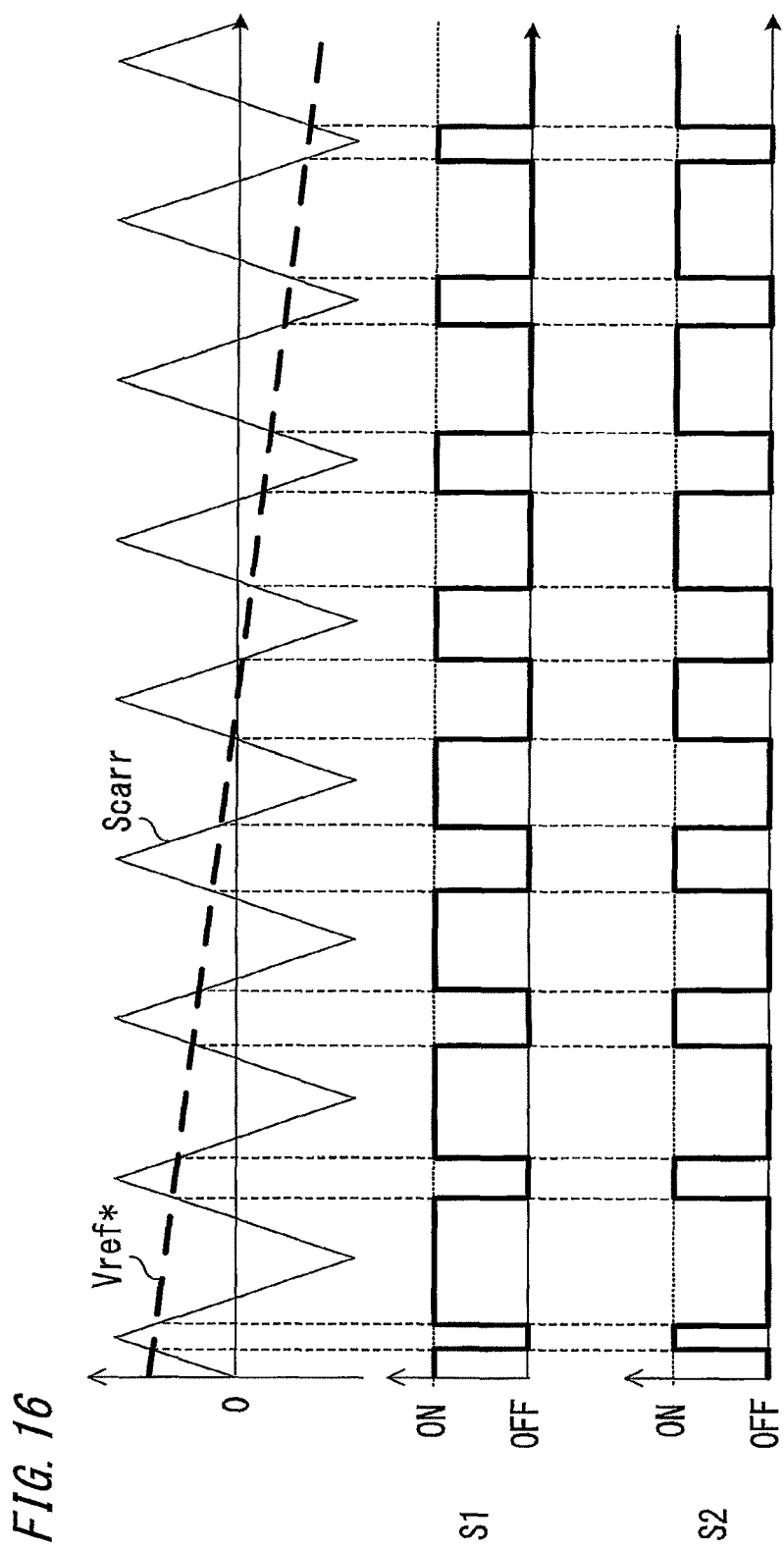
FIG. 16 is a timing chart illustrating operation of the PWM signal generation unit in FIG. 15.

FIG. 16 is a timing chart illustrating operation of the PWM signal generation unit 14.

In FIG. 16, the carrier signal Scarr is an output signal from the carrier signal generator 40, and the switching signal S1 and S2 are PWM signals outputted from the PWM signal generation unit 14 to the switching element unit 2. Hereinafter, a process for generating the PWM signals will be described with reference to FIG. 15 and FIG. 16.

The carrier signal generator 40 generates a triangular wave according to a carrier cycle. Here, the carrier signal Scarr is a triangular wave, but may be a saw-tooth wave or the like. The comparator 41 compares the corrected voltage command Vref* with the carrier signal Scarr from the carrier signal generator 40. If the command Vref* is greater than the signal Scarr, the comparator 41 outputs an ON signal, and if the command Vref* is smaller than the signal Scarr, the comparator 41 outputs an OFF signal.

One of the output signals from the comparator 41 becomes the switching (PWM) signal S1. The inverting device 42 inverts the inputted switching (PWM) signal S1 between an ON signal and an OFF signal, and outputs the resultant signal. Thus, the output signal from the inverting device 42 becomes the other switching (PWM) signal S2.

Here, it has been described that the carrier signal Scarr from the carrier signal generator 40 and the corrected voltage command Vref* are compared to generate the switching (PWM) signals S1, S2. However, in a configuration having means for detecting voltage of the input terminal 1, the corrected voltage command Vref* may be normalized using the detected voltage.

Figure 17:
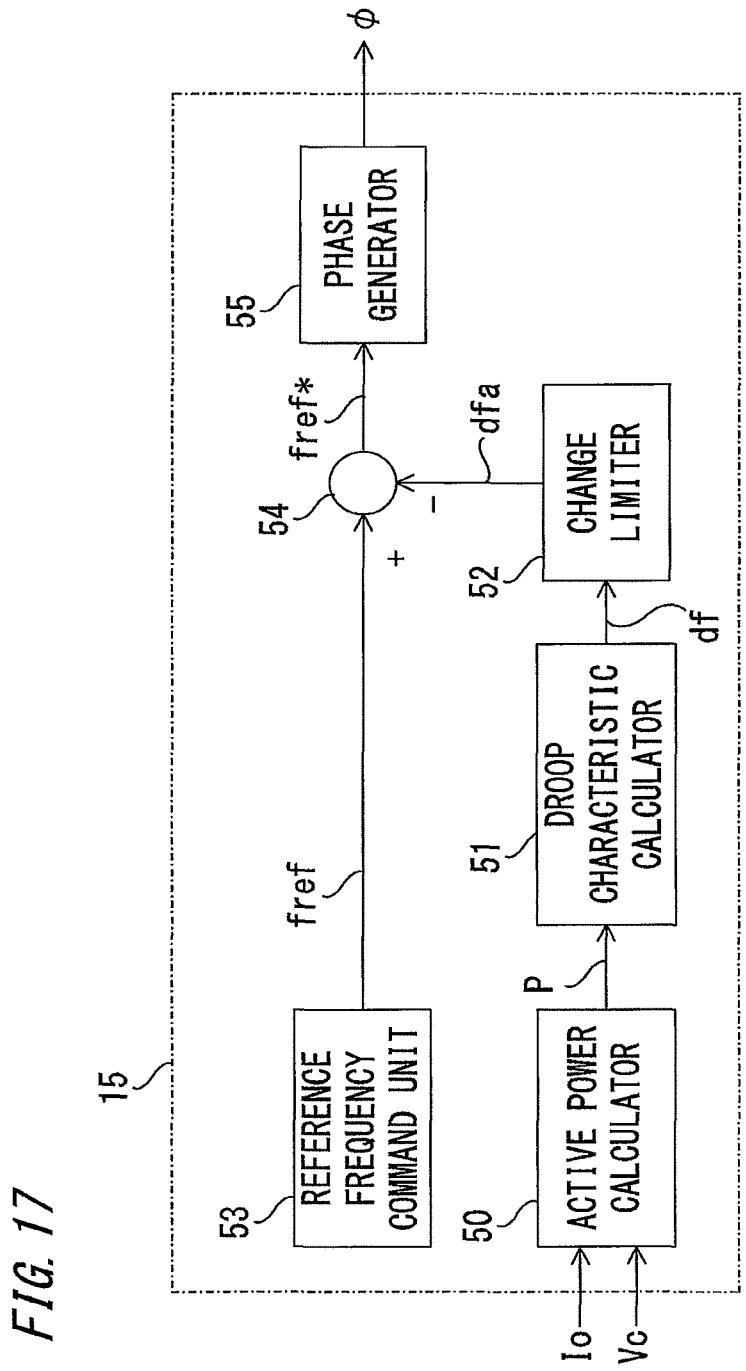
FIG. 17 is a block diagram showing the internal configuration of a PLL unit included in the control unit in FIG. 3.

FIG. 17 is a block diagram showing the internal configuration of the PLL unit 15 included in the control unit 10.

The PLL unit 15 receives the output voltage Vc and the output current Io and outputs the internal phase φ. The PLL unit 15 changes the frequency of output voltage Vc in accordance with active power P calculated from the output voltage Vc and the output current Io, and includes an active power calculator 50, a droop characteristic calculator 51, a change limiter 52, a reference frequency command unit 53, a subtractor 54, and a phase generator 55.

In FIG. 17, P is active power, df is a frequency correction command, dfa is a limited frequency correction command, fref is a reference frequency command, and fref* is a frequency command.

In the case where the plurality of power conversion devices 21 perform parallel operations, the PLL unit 15 corrects a phase difference between output voltages Vc of the respective power conversion devices 21. Error voltage occurring due to the phase difference between output voltages Vc of the respective power conversion devices 21 is mainly constituted of a cosine wave component. Thus, error voltage that is a cosine wave component is applied to the output reactor 5, and current determined by the error voltage and the impedance of the output reactor 5 flows between the power conversion devices 21. Since the current flowing between the power conversion devices 21 is mainly constituted of a sine-wave component, cross current of active power occurs between the respective power conversion devices 21. Therefore, the PLL unit 15 can suppress cross current of active power by detecting active power outputted from the power conversion device 21 and adjusting the frequency of the power conversion device 21.

The active power calculator 50 calculates active power P from the output voltage Vc detected by the output voltage detection unit 7 and the output current Io detected by the output current detection unit 8. As a specific method for calculating the active power, the average of a product (=Vc×Io) of output voltage Vc and output current Io over the cycle of the output voltage Vc is calculated. The product (=Vc×Io) of output voltage Vc and output current Io may be subjected to filter processing by a low-pass filter or the like.

The droop characteristic calculator 51 calculates the frequency correction command df in accordance with the active power P calculated by the active power calculator 50. The relationship between the frequency correction command df and the active power P is shown by the following Expression (5).

[Mathematical 5]

$$df = Kf \times P \qquad (5)$$

Here, Kf is a droop characteristic gain.

It is noted that, here, the frequency correction command df is calculated to be proportional to the active power P, but the frequency correction command df may be calculated by applying a filter to the active power P. Further, the frequency correction command df may be calculated by using also a differential element of the active power P. In the case where the power conversion devices 21 performing parallel operations have different power capacities and the proportion of active power P to be allocated is adjusted for each power conversion device 21, the droop characteristic gain Kf may be adjusted in accordance with the proportion of active power P to be allocated. Besides, it is also possible to adjust active power to be allotted to each power conversion device 21, by setting a power command offset for the active power P.

The change limiter 52 receives the frequency correction command df outputted from the droop characteristic calculator 51, and outputs a frequency correction command dfa obtained by limiting change in the frequency correction command df. The significance of providing this change limiter 52 will be described below.

In the power conversion system configured as shown in FIG. 1, it is conceivable that the power conversion devices 21 (21a, 21b) operate in cooperation with another power conversion device (not shown) that converts power of a distributed power supply such as a photovoltaic generator to commercial power.

Such a power conversion device for a distributed power supply has an isolated operation detection function. Determination as to the isolated operation detection is performed on the basis of change in the frequency of the grid voltage interconnected with the power conversion device. Therefore, in the case where the power conversion devices 21 of the present embodiment operate in cooperation with a separately provided power conversion device for a distributed power supply, there is a possibility that the power conversion device for the distributed power supply erroneously detects isolated operation on the basis of change in the frequency due to the frequency correction command df and operation is stopped. Therefore, as means for preventing erroneous detection of isolated operation, the change limiter 52 is set for the frequency correction command df.

In some of power conversion devices for distributed power supplies, a Fault Ride Through system is applied in order to prevent all the devices from being paralleled off when disturbance occurs in a power grid due to instantaneous voltage reduction or instantaneous electric outage of the power grid. In such a power conversion device to which a Fault Ride Through system is applied, it is necessary to continue operation when a ramp-shape frequency change of 2 Hz/s occurs. Therefore, it is effective that the upper limit value of the change limiter 52 is set at 2 Hz/s or lower and the lower limit value thereof is set at −2 Hz/s or higher.

In the future, it is conceivable that requirements for a power conversion device for a distributed power supply will change depending on power supply-and-demand circumstances of a power grid. In this case, it is effective that the upper limit value and the lower limit value of the change limiter 52 are set in accordance with requirements for the power conversion device for a distributed power supply.

The reference frequency command unit 53 outputs the reference frequency command fref as a frequency control target for output voltage Vc of the power conversion device 21. It is noted that the reference frequency command fref is set to a common value between the power conversion devices 21.

The subtractor 54 subtracts the limited frequency correction command dfa from the reference frequency command fref outputted from the reference frequency command unit 53, and outputs the value fref* (=fref−dfa) obtained by the subtraction, as a frequency command.

The phase generator 55 accumulates the frequency command fref* outputted from the subtractor 54, thereby generating the internal phase φ of voltage Vc outputted from the power conversion device 21.

Figure 18:
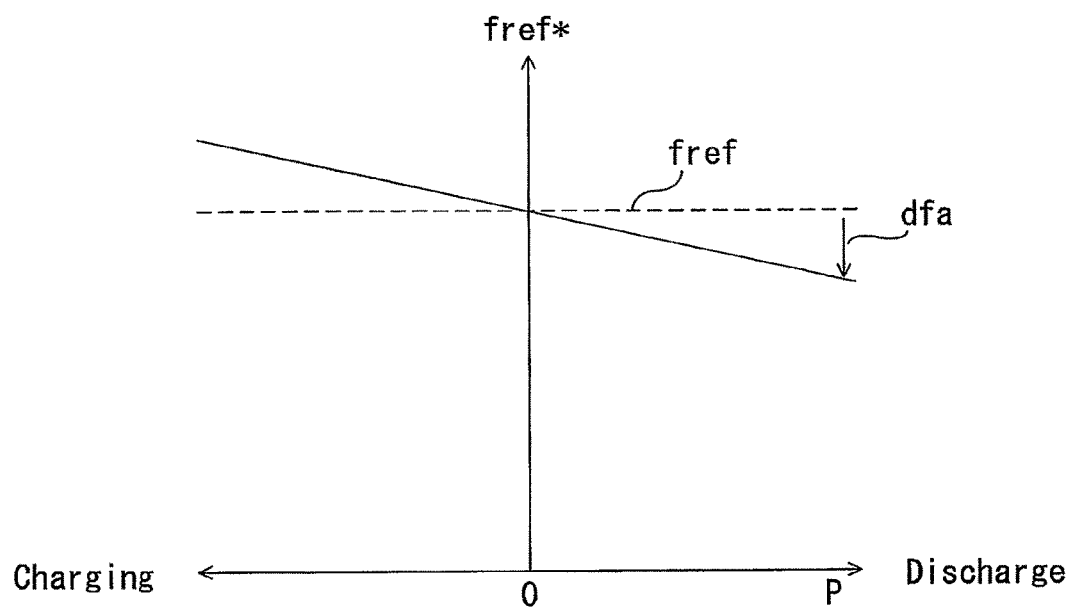
FIG. 18 illustrates a frequency command generated in the PLL unit in FIG. 17.

As described above, the PLL unit 15 operates so that the frequency command fref* has a droop characteristic in accordance with active power outputted from the power conversion device 21, and the frequency command fref* changes as shown in FIG. 18. Specifically, when the power conversion device 21 outputs positive active power P to the output terminal 9 side, the frequency command fref* is decreased, and when the power conversion device 21 outputs negative active power P to the output terminal 9 side, the frequency command fref* is increased.

Figure 19:
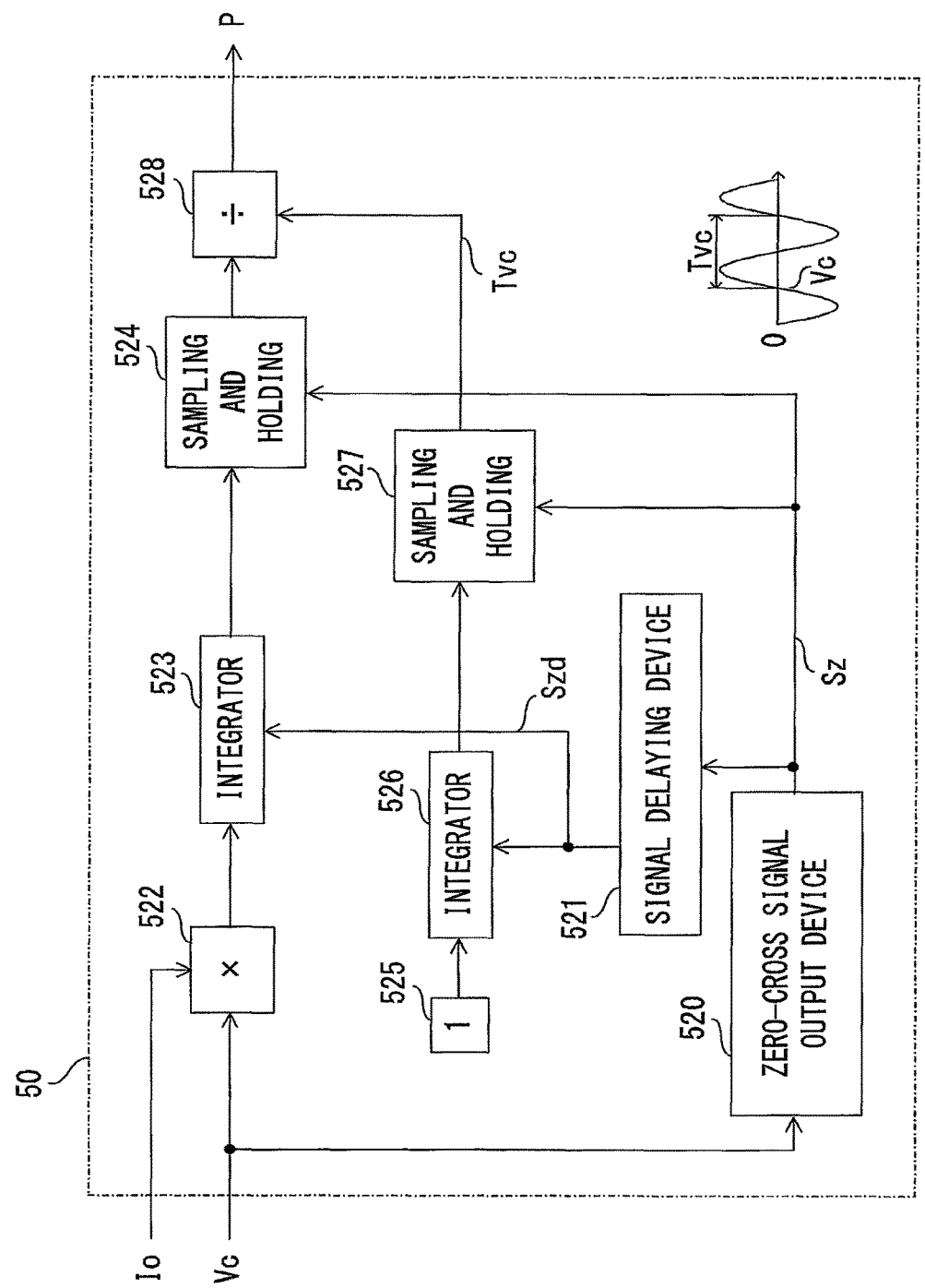
FIG. 19 is a block diagram showing the internal configuration of an active power calculator included in the PLL unit in FIG. 17.

FIG. 19 is a block diagram showing the internal configuration of the active power calculator 50 included in the PLL unit 15.

The active power calculator 50 receives output voltage Vc and output current Io, and performs calculation shown by the following Expression (6), thereby outputting active power P.

[Mathematical 6]

$$P = \frac{Tc}{Tvc} \times \sum_{n=1}^{m} (Ion \times Vcn) \quad (6)$$

Here, Tvc is the cycle of output voltage Vc, Tc is the calculation cycle, m is the number of calculations in which processing with a calculation cycle of Tc is performed during the cycle Tvc, n is a calculation number counted from zero-crossing of Vc (1 corresponds to the oldest value, m corresponds to the latest value, and n corresponds to the present value), Vcn is the present value of output voltage Vc, and Ion is the present value of output current Io.

The active power calculator 50 includes a zero-cross signal output device 520, a signal delaying device 521, a multiplier 522, integrators 523, 526, sampling-and-holding devices 524, 527, a fixed signal output device 525, and a divider 528.

In FIG. 19, Sz is a zero-cross signal and Szd is a delayed zero-cross signal.

The zero-cross signal output device 520 receives output voltage Vc. Then, if the output voltage Vc is positive, the zero-cross signal output device 520 outputs a positive zero-cross signal Sz, and if the output voltage Vc is negative, the zero-cross signal output device 520 outputs a negative zero-cross signal Sz. At this time, due to variation in the output voltage Vc, zero-crossing might be detected a plurality of times within a short time period (for example, shorter than 5 ms) (chattering). As measures for such chattering, after zero-crossing is detected, detection of zero-crossing may be masked (the zero-cross signal Sz may be prevented from changing) during a certain time period (for example, 5 ms). In addition, hysteresis may be provided for the positive/negative determination of output voltage Vc (for example, when output voltage Vc is 1 V or higher, output voltage Vc may be determined to be positive, and when output voltage Vc is −1 V or lower, output voltage Vc may be determined to be negative).

The signal delaying device 521 receives the zero-cross signal Sz and outputs the delayed zero-cross signal Szd which is delayed by a signal corresponding to one calculation step of the active power calculator 50. The signal delaying device 521 provides a delay between the signal (zero-cross signal Sz) for sampling and holding, and a signal (delayed zero-cross signal Szd) for resetting the integrator. Thus, the order of integrator-output sampling-and-holding operation performed in accordance with the zero-cross signal Sz and operation of resetting the integrator is ensured.

The fixed signal output device 525 outputs a fixed value that is a signal value "1". This signal is accumulated by the integrator 526, to obtain an elapsed time of measurement of the cycle of output voltage Vc.

The integrator 526 receives output of the fixed signal output device 525 and the delayed zero-cross signal Szd, and outputs a cycle measurement value of output voltage Vc obtained by integrating output of the fixed signal output device 525. When the delayed zero-cross signal Szd changes from negative to positive, the integrator 526 resets the integral value to 0 and integrates output of the fixed signal output device 525. The integrator 526 accumulates a value obtained by multiplying a calculation step period by output of the fixed signal output device 525, every calculation step. Thus, output of the integrator 526 becomes an elapsed time since the timing at which the delayed zero-cross signal Szd changed from negative to positive.

The sampling-and-holding device 527 receives output of the integrator 526 and the zero-cross signal Sz, and outputs the cycle Tvc of output voltage Vc. The sampling-and-holding device 527 updates output of the sampling-and-holding device 527 to output of the integrator 526 at a timing at which the zero-cross signal Sz changes from negative to positive. Output of the sampling-and-holding device 527 does not change at the other timings. Through this operation, a cycle with which output voltage Vc changes from negative to positive can be measured.

The multiplier 522 receives the output voltage Vc and the output current Io, and outputs a result (Vc×Io) of multiplication of these values.

The integrator 523 receives output of the multiplier 522 and the delayed zero-cross signal Szd, and outputs a value obtained by accumulating output of the multiplier 522. Here, the integrator 523 accumulates a value obtained by multiplying a calculation step period by output of the multiplier 522, every calculation step, and the integral value thereof is reset at a timing at which the delayed zero-cross signal Szd changes from negative to positive.

The sampling-and-holding device 524 receives output of the integrator 523 and the zero-cross signal Sz, and updates output of the sampling-and-holding device 524 to output of the integrator 523 at a timing at which the zero-cross signal Sz changes from negative to positive. Output of the sampling-and-holding device 524 does not change at the other timings.

The divider 528 receives output of the sampling-and-holding device 524 and the cycle Tvc of output voltage Vc, and outputs a result of dividing output of the sampling-and-holding device 524 by the cycle Tvc of output voltage Vc. For the divider 528, a lower limit value may be set for the cycle Tvc of output voltage Vc so as to prevent division by 0 when the cycle Tvc of output voltage Vc is 0.

Figure 20:
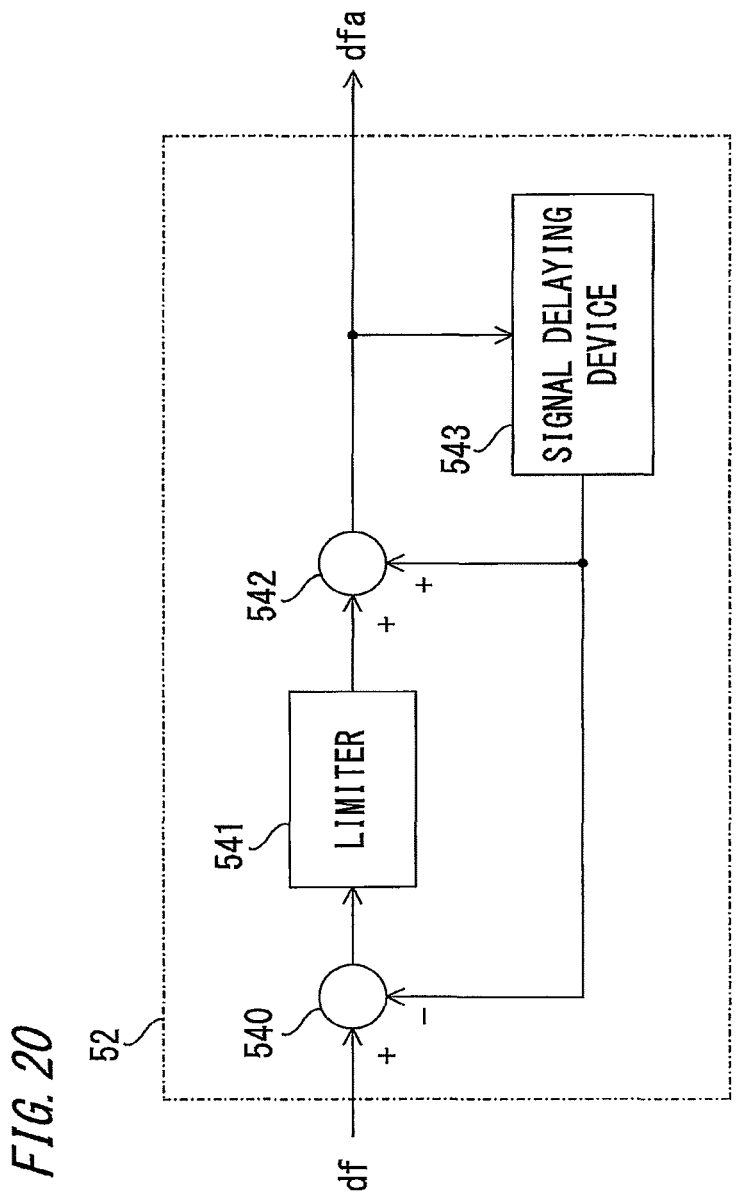
FIG. 20 is a block diagram showing the internal configuration of a change limiter included in the PLL unit in FIG. 17.

FIG. 20 is a block diagram showing the internal configuration of the change limiter 52 included in the PLL unit 15.

The change limiter 52 receives the frequency correction command df and outputs the limited frequency correction command dfa, thus providing limitation on change in the frequency correction command df per calculation step of the PLL unit 15.

The change limiter 52 includes a subtractor 540, a limiter 541, an adder 542, and a signal delaying device 543.

The subtractor 540 receives the frequency correction command df and output of the signal delaying device 543 corresponding to the previous frequency correction command, and outputs the subtraction result thereof (frequency correction command df−previous frequency correction command). The subtraction result becomes a change amount per calculation step of the frequency correction command df (calculation step by PLL unit 15).

The limiter 541 outputs a value obtained by limiting the change amount per calculation step of the frequency correction command df, outputted from the subtractor 540. The frequency change to be limited can be set using the upper limit value and the lower limit value of the limiter 541. For example, in the case of limiting change in the frequency correction command df within ±2 Hz/s, the upper limit value of the limiter 541 is to be set at 2×(calculation step period of PLL unit 15) and the lower limit value of the limiter 541 is to be set at −2×(calculation step period of PLL unit 15).

The adder 542 receives output of the limiter 541 and output of the signal delaying device 543, and outputs the limited frequency correction command dfa which is a result of adding these received values. The limited frequency correction command dfa is inputted to the signal delaying device 543, and a value obtained by delaying the input by one calculation step of the PLL unit 15 is outputted from the signal delaying device 543. This output corresponds to the previous frequency correction command.

Figure 21:
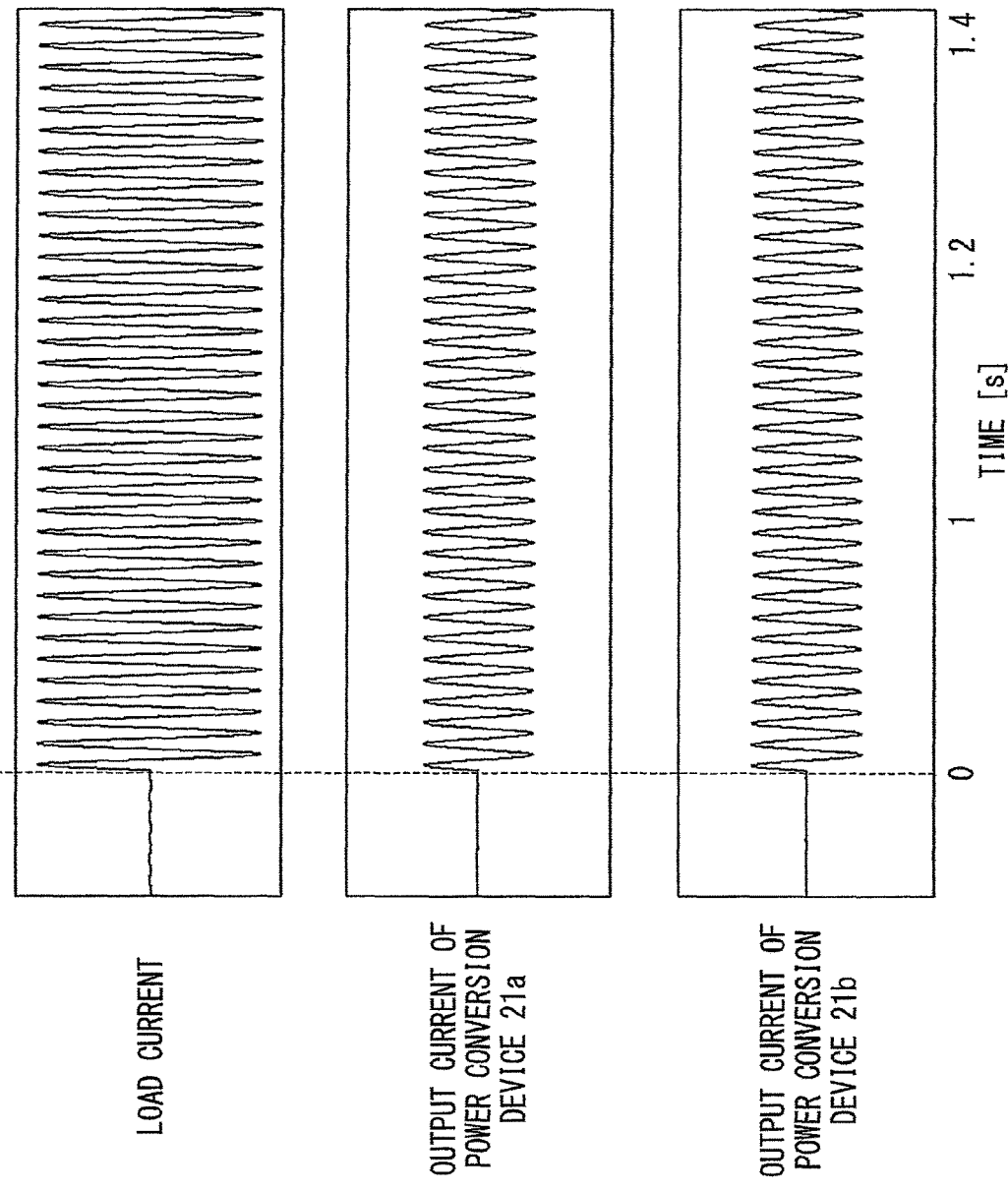
FIG. 21 is a timing chart illustrating parallel operations of the plurality of power conversion devices according to embodiment 1 of the present invention.
Figure 22:
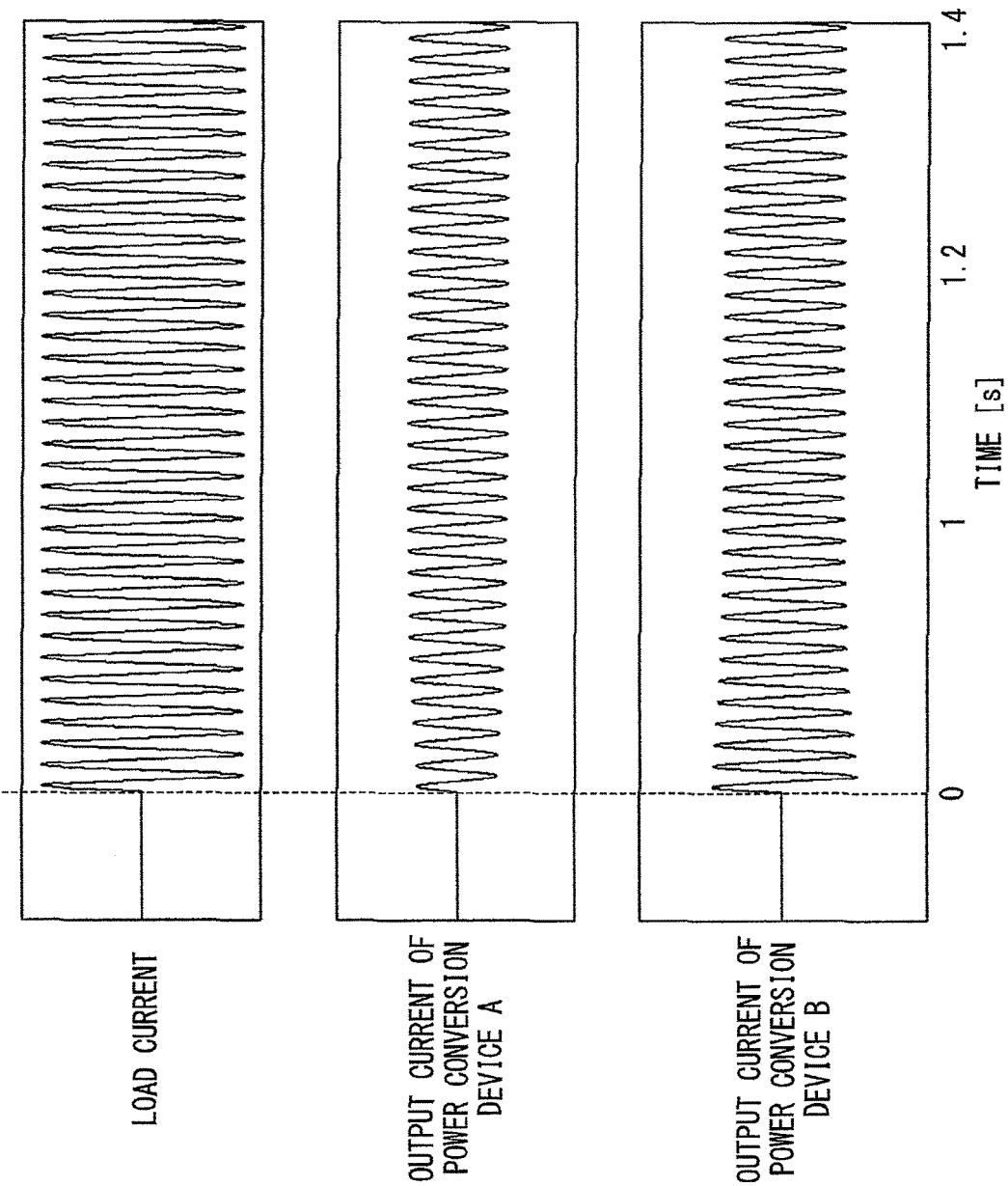
FIG. 22 is a timing chart illustrating parallel operations of a plurality of power conversion devices in a comparative example.

FIG. 21 is a timing chart illustrating parallel operations of the respective power conversion devices 21a, 21b in the power conversion system according to the present embodiment. FIG. 22 is a timing chart illustrating parallel operations of two power conversion devices A, B in a power conversion system in which the two power conversion devices A, B perform parallel operations, as a comparative example.

In the power conversion devices A, B in the comparative example, the voltage correction amount calculation unit 12 and the voltage command correcting unit 13 according to the present embodiment are not provided, and the voltage command Vref generated by the voltage command generation unit 11 is used for generation of PWM signals, without being corrected. The other configurations are the same as those of the power conversion devices 21 (21a, 21b).

FIG. 21 and FIG. 22 show load currents (current waveforms of AC loads), output currents flowing through the power conversion devices 21a, A (waveforms of currents flowing through output reactors), and output currents flowing through the other power conversion devices 21b, B (waveforms of currents flowing through output reactors). It is noted that, normally, each load current is the sum of output currents of the two power conversion devices performing parallel operations.

Here, for the purpose of showing the effects of the present embodiment, in both cases of FIG. 21 and FIG. 22, the inductance components of the filter reactors 3 of the power conversion devices 21b, B are set to be smaller than the inductance components of the filter reactors 3 of the power conversion devices 21a, A.

Although FIG. 21 and FIG. 22 show waveforms in single-phase configurations, the present invention is not limited to a single-phase configuration but is applicable to a three-phase configuration.

First, the comparative example shown in FIG. 22 will be described.

In comparison between output current of the power conversion device A and output current of the power conversion device B, load current allocation is biased to the power conversion device B at the time of applying a load. This is because the inductance components of the filter reactors 3 are different between the two power conversion devices A, B. That is, since the inductance component of the filter reactor 3 of the power conversion device B is smaller than the inductance component of the filter reactor 3 of the power conversion device A, the impedance of the power conversion device B is smaller and current allocation to the power conversion device B becomes greater. As a result, instantaneous power allocation thereto also becomes greater.

Thereafter, allocations of output currents of both power conversion devices A, B are improved to be equalized, as time elapses. The reason therefor will be described below. The reference frequency command fref is corrected by the frequency correction command df from the droop characteristic calculator 51 included in the PLL unit 15 of each power conversion device A, B. Thus, a voltage phase difference occurs between the switching element unit 2 side end of the filter reactor 3 and the filter capacitor 4 side end of the filter reactor 3. Currents of the filter reactors 3 of the respective power conversion devices A, B are adjusted in accordance with the voltage phase difference, and thus powers are uniformly allocated to the respective power conversion devices A, B in a steady state.

As described above, in parallel operations of the power conversion devices A, B in the comparative example, it is difficult to uniform current allocations when instantaneous power change occurs at the time of, for example, applying a load.

Next, an example of parallel operations of the power conversion devices 21a, 21b according to the present embodiment, shown in FIG. 21, will be described.

In comparison between output current of the power conversion device 21a and output current of the power conversion device 21b, bias of current is corrected at the time of applying a load. This is because error in the inductance component of the filter reactor 3 as described above is corrected by the voltage correction amount calculation unit 12 and the voltage command correcting unit 13 included in each power conversion device 21*a*, 21*b*.

As time elapses, allocations of output currents of both power conversion devices 21*a*, 21*b* are improved to be equalized. The reason therefor is the same as described in FIG. 22. That is, the reference frequency command fref is corrected by the frequency correction command df from the droop characteristic calculator 51 included in the PLL unit 15 of each power conversion device 21*a*, 21*b*. Thus, a voltage phase difference occurs between the switching element unit 2 side end of the filter reactor 3 and the filter capacitor 4 side end of the filter reactor 3. Currents of the filter reactors 3 of the respective power conversion devices 21*a*, 21*b* are adjusted in accordance with the voltage phase difference, and thus powers are uniformly allocated to the respective power conversion devices 21*a*, 21*b* in a steady state.

As described above, in the present embodiment 1, in the case where the plurality of power conversion devices 21*a*, 21*b* are driven in parallel to supply powers to the AC load 61, the voltage correction amount calculation unit 12 calculates the correction amount VL* corresponding to voltage drop due to the impedance between the switching element unit 2 and the filter reactor 3 composing each power conversion device 21*a*, 21*b*, and the voltage command correcting unit 13 corrects the voltage command Vref using the correction amount VL*. Thus, for the power conversion device that has a small output impedance, correction is performed so as to increase the output impedance thereof, whereby variation in output impedances is suppressed.

Therefore, even when instantaneous power change occurs at the time of, for example, applying a load, concentration of power allocation (allocated current) is prevented and power allocations can be improved to be uniformed between the power conversion devices 21*a*, 21*b*. Furthermore, the PLL unit 15 changes the frequency of output voltage Vc in accordance with active power calculated from output voltage Vc and output current Io of each power conversion device 21*a*, 21*b*, whereby power allocations in a steady state can also be uniformed.

Figure 23:
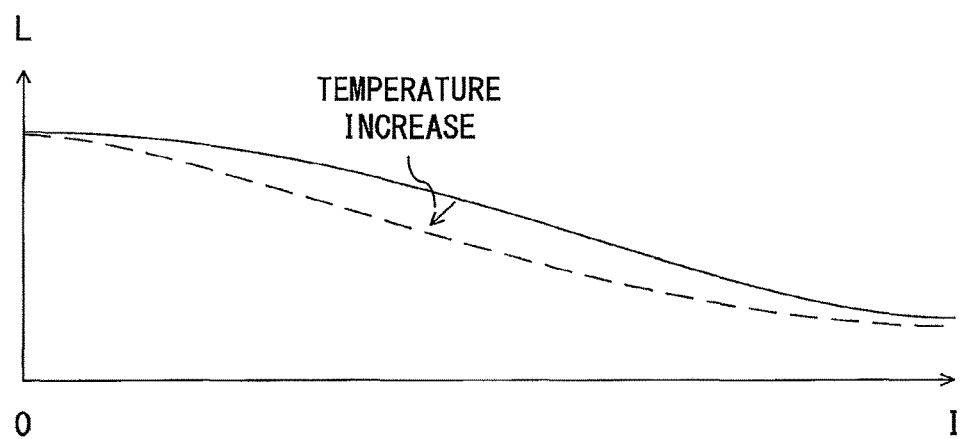
FIG. 23 illustrates inductance reduction of a filter reactor in the power conversion device according to embodiment 1 of the present invention.

The inductance of the filter reactor 3 can vary also depending on the temperature of the filter reactor 3. As shown in FIG. 23, in general, the inductance decreases with increase in temperature, and near the Curie temperature, the inductance sharply decreases. As a result of decrease in the inductance of the filter reactor 3, the impedance of the power conversion device 21 decreases. Therefore, in the case where the plurality of power conversion devices 21 perform parallel operations, if difference occurs between the temperatures of the filter reactors 3 of the respective power conversion devices 21, difference also occurs between the impedances of the respective power conversion devices 21.

Further, if current flowing through the filter reactor 3 increases, the inductance decreases due to magnetic saturation, so that the impedance of the power conversion device 21 decreases.

In the case where the plurality of power conversion devices 21 perform parallel operations, load current concentrates on the power conversion device 21 that has a decreased impedance, and therefore overcurrent is likely to occur in that power conversion device 21. As described above, even if variation occurs in impedances of the plurality of power conversion devices 21 performing parallel operations, in the present embodiment, each power conversion device 21 is operated so that current flows with impedance reduction suppressed, whereby power allocations to the power conversion devices 21*a*, 21*b* can be uniformed.

Further, in the case where cross current of DC current occurs between the power conversion devices 21, an effect of reducing the cross current of DC current is also obtained by setting the virtual resistance Rset in the voltage correction amount calculation unit 12.

Embodiment 2

Figure 24:
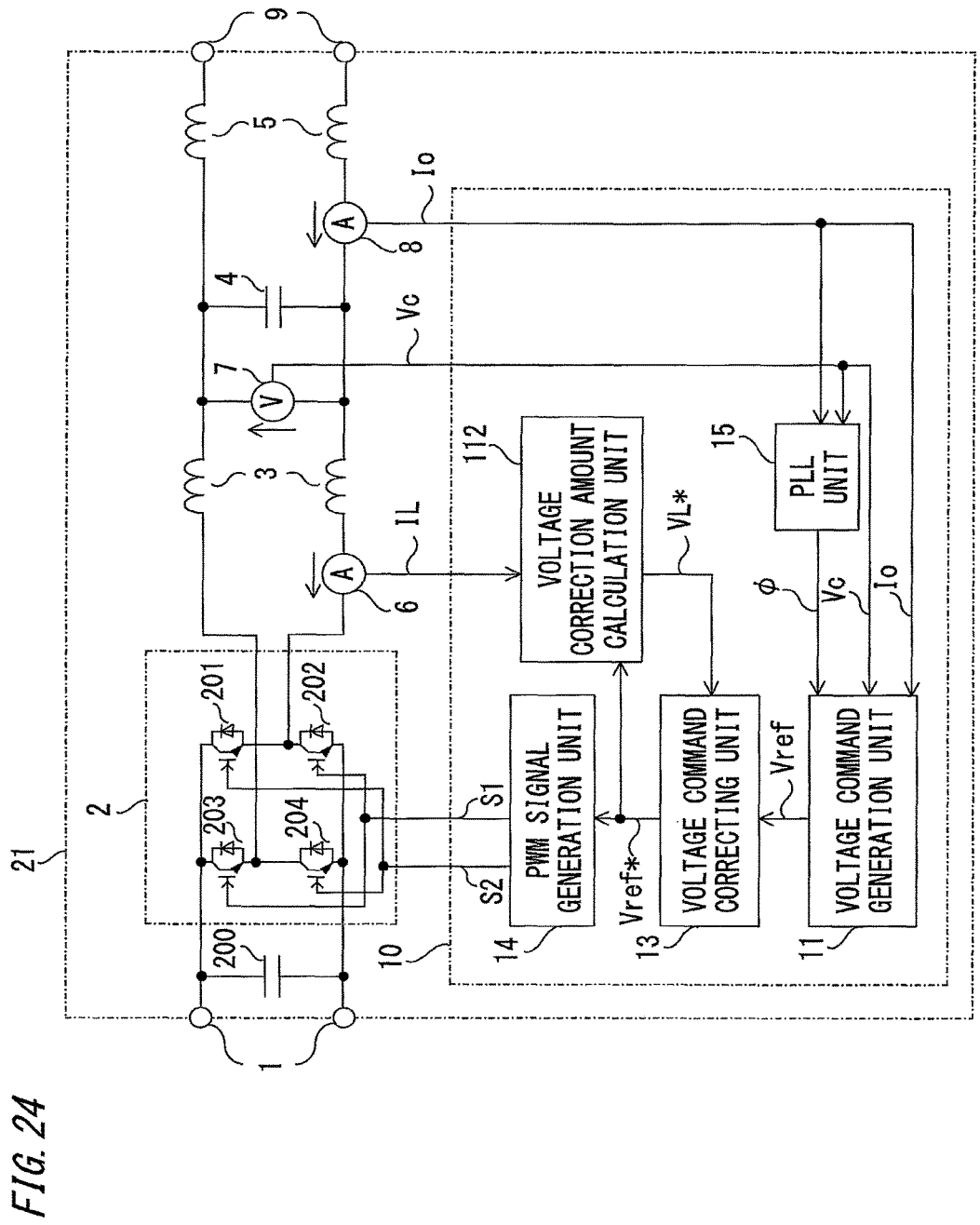
FIG. 24 is a block diagram showing the configuration of a power conversion device according to embodiment 2 of the present invention.

FIG. 24 is a block diagram showing the configuration of a power conversion device applied to a power conversion system according to embodiment 2 of the present invention. The components that correspond to or are the same as those shown in FIG. 3 in embodiment 1 are denoted by the same reference characters.

The present embodiment 2 is the same as embodiment 1 in that the control unit 10 includes the voltage command generation unit 11, a voltage correction amount calculation unit 112, the voltage command correcting unit 13, the PWM signal generation unit 14, and the PLL unit 15. Difference from embodiment 1 is that the corrected voltage command Vref* outputted from the voltage command correcting unit 13 is inputted to the voltage correction amount calculation unit 12, and the internal configuration of the voltage correction amount calculation unit 112 is also different from that in embodiment 1. Hereinafter, the details of the voltage correction amount calculation unit 112 will be described.

In the present embodiment 2, the voltage correction amount calculation unit 112 calculates the correction amount VL* for the voltage command on the basis of the reactor current IL, the output voltage Vc, and the output Vref* from the voltage command correcting unit 13. As is also described in embodiment 1, the correction amount VL* of the voltage command corresponds to a phenomenon that voltage drop due to impedance occurs between the switching element unit 2 and the filter reactor 3. An example of calculation by the voltage correction amount calculation unit 112 is shown by the following Expression (7).

[Mathematical 7]

$$VL* = Lset \times \frac{d}{dt}IL - KVL \times (Vref* - Vc) + Rset \times IL \quad (7)$$

Here, VL* is the correction amount for the voltage command, calculated by the voltage correction amount calculation unit 112, IL is reactor current detected by the reactor current detection unit 6, Vc is output voltage detected by the output voltage detection unit 7, Vref* is the corrected voltage command corrected by the voltage command correcting unit 13, Lset is the inductance component gain, KVL is the reactor voltage gain, and Rset is the resistance component gain.

Figure 25:
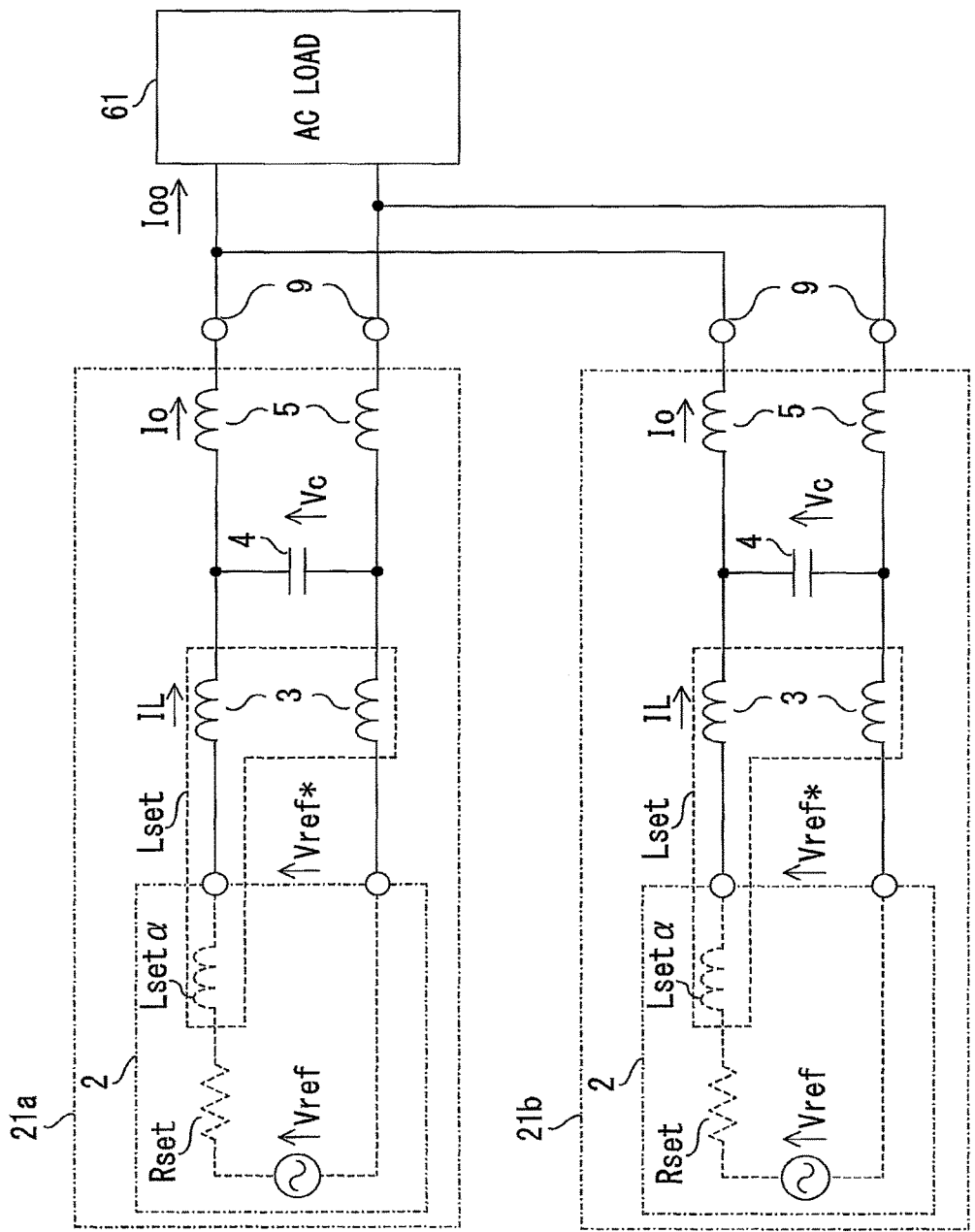
FIG. 25 illustrates a virtual resistance and a virtual inductance in the power conversion device according to embodiment 2 of the present invention.

Specifically, as shown in FIG. 25, operation is performed such that the virtual resistance Rset and a virtual inductance Lsetα are present inside the switching element unit 2 of each power conversion device 21 (21*a*, 21*b*). The virtual inductance Lsetα is set so that the sum of the virtual inductance Lsetα and the inductance of the filter reactor 3 become Lset.

Voltage drop when reactor current IL flows through the inductance Lset is calculated from the reactor current IL and the inductance component gain Lset, and this corresponds to the first term on the right-hand side of Expression (7). Voltage obtained by subtracting voltage drop of the filter reactor 3 (corresponding to the second term on the right side in Expression (7)) from the value of the first term is defined as voltage drop due to the virtual inductance Lsetα. Thus, it is possible to set the virtual inductance Lsetα, considering also the inductance of the filter reactor 3. Then, the voltage command Vref can be corrected so that the inductance including the actual inductance component of the filter reactor 3 and the virtual inductance Lsetα becomes Lset.

In Expression (7), the first term and the third term on the right-hand side are the same as the first term and the second term on the right-hand side of Expression (3) shown in the above embodiment 1, and can be calculated by the same method as in embodiment 1.

The second term on the right-hand side of Expression (7) corresponds to voltage applied to the filter reactor 3, which is estimated on the basis of the output voltage Vc detected by the output voltage detection unit 7 and the corrected voltage command Vref* obtained by the voltage command correcting unit 13. In this case, a value obtained by causing a difference between the corrected voltage command Vref* and the output voltage Vc to pass through a filter or the like may be used, or a moving average value may be used.

If the inductance component of the filter reactor 3 included in the inductance component Lset is desired to be reduced, it suffices that the reactor voltage gain KVL is reduced. For example, in the case where Lset is 2 mH, the inductance of the filter reactor 3 is 1 mH, and the reactor voltage gain KVL is 1, inductance 1 mH obtained by subtracting inductance 1 mH of the filter reactor 3 from Lset becomes the virtual inductance Lsetα inside the switching element unit 2. On the other hand, in the case where the reactor voltage gain is 0.5, inductance 1.5 mH obtained by subtracting, from Lset, 0.5 mH which is obtained by multiplying the inductance of the filter reactor 3 by the reactor voltage gain KVL, becomes the virtual inductance Lsetα inside the switching element unit 2.

By subtracting the second term from the first term on the right-hand side of Expression (7), it is possible to correct only error of the inductance component of the filter reactor 3 with respect to the inductance component gain Lset. Thus, it is possible to set the output impedance of the power conversion device 21, using the inductance component gain Lset as a reference, more accurately than in the case of embodiment 1.

For example, in the case where the power conversion device 21a and the power conversion device 21b perform parallel operations, it is assumed that the inductance design value of the filter reactor 3 is 1 mH, whereas the inductance of the filter reactor 3 of the power conversion device 21a is 1.2 mH (deviation of 20%) and the inductance of the filter reactor 3 of the power conversion device 21b is 0.8 mH (deviation of −20%). In this case, at the time of load inrush or the like, current allocation (power allocation) to the power conversion device 21b is about 1.5 times current allocation (power allocation) to the power conversion device 21a.

Here, if the inductance component gain Lset is set at 0.002, it appears that the composite inductance Lset obtained by connecting the virtual inductance inside the switching element unit 2 and the inductance of the filter reactor 3 in series is 2 mH in both of the power conversion devices 21a, 21b. Thus, at the time of load inrush or the like, current allocations (power allocations) to the power conversion devices 21a, 21ba are improved to be equalized.

The other configurations and operational effects are the same as those in embodiment 1, and the detailed description thereof is omitted here.

It is noted that the present invention is not limited only to the configurations of the above embodiments 1, 2, and without departing from the scope of the present invention, the configurations of each embodiment 1, 2 may be partially modified, or some of the components thereof may be omitted. In addition, the configurations of the embodiment 1, 2 may be combined with each other as appropriate.

The invention claimed is:

1. A power conversion device including a switching element unit for converting voltage of a DC power supply connected externally, to voltage corresponding to a voltage command, to supply AC power to a load, the power conversion device comprising:
   a filter reactor and a filter capacitor for
   smoothing output of the switching element unit;
   an output reactor provided between the load and the filter capacitor;
   a reactor current detection unit for detecting reactor current flowing through the filter reactor;
   an output voltage detection unit for detecting output voltage of the power conversion device;
   an output current detection unit for detecting current flowing through the output reactor, as output current; and
   a control unit for drive-controlling the switching element unit on the basis of detection outputs from the reactor current detection unit, the output voltage detection unit, and the output current detection unit, wherein
   the control unit includes a voltage command generation unit for generating the voltage command for controlling the output voltage of the power conversion device, a PWM signal generation unit for generating a PWM signal for driving the switching element unit, on the basis of the voltage command, and a PLL unit for changing a frequency of the output voltage in accordance with active power calculated on the basis of the output voltage and the output current, and
   the control unit further includes a voltage correction amount calculation unit for calculating a voltage command correction amount on the basis of the reactor current, and a voltage command correcting unit which corrects the voltage command in accordance with the voltage command correction amount and outputs the corrected voltage command to the PWM signal generation unit.

2. The power conversion device according to claim 1, wherein
   the voltage command correction amount calculated by the voltage correction amount calculation unit is a value proportional to a differential value of the reactor current.

3. The power conversion device according to claim 1, wherein
   the voltage command correction amount calculated by the voltage correction amount calculation unit includes a value proportional to the reactor current in addition to a value proportional to a differential value of the reactor current.

4. The power conversion device according to claim 2, wherein
   the voltage command correction amount calculated by the voltage correction amount calculation unit includes a value proportional to a difference between the output voltage detected by the output voltage detection unit and the corrected voltage command outputted from the voltage command correcting unit.

5. The power conversion device according to claim 1, wherein the voltage command generation unit corrects an amplitude of the voltage command in accordance with an effective value of the output voltage detected by the output voltage detection unit.

6. The power conversion device according to claim 1, wherein
the voltage command generation unit detects reactive power on the basis of the output voltage detected by the output voltage detection unit and the output current detected by the output current detection unit, and corrects an amplitude of the voltage command in accordance with the reactive power.

7. A power conversion system comprising a plurality of the power conversion devices according to claim 1, wherein
the plurality of power conversion devices are operated in parallel to supply AC power to the load.

8. The power conversion device according to claim 3, wherein
the voltage command correction amount calculated by the voltage correction amount calculation unit includes a value proportional to a difference between the output voltage detected by the output voltage detection unit and the corrected voltage command outputted from the voltage command correcting unit.

9. The power conversion device according to claim 2, wherein
the voltage command generation unit corrects an amplitude of the voltage command in accordance with an effective value of the output voltage detected by the output voltage detection unit.

10. The power conversion device according to claim 3, wherein
the voltage command generation unit corrects an amplitude of the voltage command in accordance with an effective value of the output voltage detected by the output voltage detection unit.

11. The power conversion device according to claim 4, wherein
the voltage command generation unit corrects an amplitude of the voltage command in accordance with an effective value of the output voltage detected by the output voltage detection unit.

12. The power conversion device according to claim 8, wherein
the voltage command generation unit corrects an amplitude of the voltage command in accordance with an effective value of the output voltage detected by the output voltage detection unit.

13. The power conversion device according to claim 2, wherein
the voltage command generation unit detects reactive power on the basis of the output voltage detected by the output voltage detection unit and the output current detected by the output current detection unit, and corrects an amplitude of the voltage command in accordance with the reactive power.

14. The power conversion device according to claim 3, wherein
the voltage command generation unit detects reactive power on the basis of the output voltage detected by the output voltage detection unit and the output current detected by the output current detection unit, and corrects an amplitude of the voltage command in accordance with the reactive power.

15. The power conversion device according to claim 4, wherein
the voltage command generation unit detects reactive power on the basis of the output voltage detected by the output voltage detection unit and the output current detected by the output current detection unit, and corrects an amplitude of the voltage command in accordance with the reactive power.

16. The power conversion device according to claim 5, wherein
the voltage command generation unit detects reactive power on the basis of the output voltage detected by the output voltage detection unit and the output current detected by the output current detection unit, and corrects an amplitude of the voltage command in accordance with the reactive power.

17. The power conversion device according to claim 8, wherein
the voltage command generation unit detects reactive power on the basis of the output voltage detected by the output voltage detection unit and the output current detected by the output current detection unit, and corrects an amplitude of the voltage command in accordance with the reactive power.

18. A power conversion system comprising a plurality of the power conversion devices according to claim 2, wherein
the plurality of power conversion devices are operated in parallel to supply AC power to the load.

19. A power conversion system comprising a plurality of the power conversion devices according to claim 3, wherein
the plurality of power conversion devices are operated in parallel to supply AC power to the load.

20. A power conversion system comprising a plurality of the power conversion devices according to claim 4, wherein
the plurality of power conversion devices are operated in parallel to supply AC power to the load.

* * * * *